United States Patent
Rotter et al.

(10) Patent No.: US 11,591,989 B2
(45) Date of Patent: Feb. 28, 2023

(54) BAIL DRIVEN STALE FUEL EVACUATION

(71) Applicant: Kohler Co., Kohler, WI (US)

(72) Inventors: Terrence Michael Rotter, Sheboygan Falls, WI (US); Jarrod J. Jackett, Cleveland, WI (US); Mark Jason Huibregtse, Elkhart Lake, WI (US); Michael James Dins, Cleveland, WI (US); Jonathan Thomas Bykowski, Shorewood, WI (US); Michael Jon Duwe, Cleveland, WI (US); Brett Michael Wegner, Glenbeulah, WI (US); Michael James Tursky, Fond du Lac, WI (US); Adam John Reich, Whitelaw, WI (US)

(73) Assignee: KOHLER CO.

( * ) Notice: Subject to any disclaimer, the term of this patent is extended or adjusted under 35 U.S.C. 154(b) by 0 days.

(21) Appl. No.: 17/193,819

(22) Filed: Mar. 5, 2021

(65) Prior Publication Data
US 2021/0190016 A1    Jun. 24, 2021

Related U.S. Application Data

(63) Continuation of application No. 16/293,149, filed on Mar. 5, 2019, now Pat. No. 11,008,978.

(51) Int. Cl.
    *F02M 19/06*    (2006.01)
    *F02M 1/16*     (2006.01)
    (Continued)

(52) U.S. Cl.
    CPC .............. *F02M 19/06* (2013.01); *F02M 1/16* (2013.01); *A01D 34/001* (2013.01); *A01D 2101/00* (2013.01); *F02M 2700/438* (2013.01)

(58) Field of Classification Search
    CPC .... F02M 19/06; F02M 1/16; F02M 2700/438; A01D 34/001; A01D 2101/00
    (Continued)

(56) References Cited

U.S. PATENT DOCUMENTS

| 1,497,003 A | 6/1924 | Soule |
| 1,750,109 A * | 3/1930 | Kirby ................. F02M 21/00 261/41.2 |

(Continued)

FOREIGN PATENT DOCUMENTS

| CN | 103032206 A | 4/2013 |
| CN | 203925784 U | 11/2014 |

(Continued)

OTHER PUBLICATIONS

Echo, Inc. "Pas-225 Pro Attachment Series: Operator's Manual" p. 1-32. Publication Date: Sep. 2013.
(Continued)

*Primary Examiner* — Logan M Kraft
*Assistant Examiner* — John D Bailey
(74) *Attorney, Agent, or Firm* — The Belles Group, P.C.

(57) ABSTRACT

A carburetor drain apparatus includes a carburetor bowl, a fuel supply pipe, a fuel drain pipe, and a bail interface. The carburetor bowl is configured to store fuel and provide the fuel to an air passage. The fuel supply pipe is connected a fuel tank and the carburetor bowl. The fuel drain pipe is connected to the carburetor bowl. The bail interface is configured to operate in response to actuation of a bail to open the fuel drain pipe.

15 Claims, 33 Drawing Sheets

(51) Int. Cl.
*A01D 101/00* (2006.01)
*A01D 34/00* (2006.01)

(58) Field of Classification Search
USPC .................................................... 123/179.9
See application file for complete search history.

(56) References Cited

U.S. PATENT DOCUMENTS

| | | | | |
|---|---|---|---|---|
| 1,868,988 | A | * | 7/1932 | Muzzy ............... F04B 9/042 137/215 |
| 2,340,975 | A | * | 2/1944 | Morgan .............. B67D 7/64 91/496 |
| 2,758,639 | A | * | 8/1956 | Donnell .............. F02M 1/00 137/391 |
| 2,763,253 | A | * | 9/1956 | Murrah .............. F01L 1/00 123/511 |
| 2,928,268 | A | * | 3/1960 | Hetzer ............... D06F 43/081 210/167.01 |
| 2,965,086 | A | * | 12/1960 | Gregory ............. F02M 5/08 123/517 |
| 2,986,133 | A | * | 5/1961 | Mattson ............. F02M 5/12 123/517 |
| 3,005,486 | A | * | 10/1961 | Donnell ............. F02M 1/00 137/434 |
| 3,048,157 | A | | 8/1962 | Gregory et al. |
| 3,120,242 | A | * | 2/1964 | Schneider .......... F02M 1/00 137/437 |
| 3,162,235 | A | * | 12/1964 | Capehart ........... F02M 17/06 123/517 |
| 3,227,427 | A | * | 1/1966 | Wells ................ F02M 33/02 261/115 |
| 3,290,871 | A | | 12/1966 | Haas |
| 3,324,842 | A | | 6/1967 | Haas |
| 3,502,307 | A | * | 3/1970 | Thuesen ............. F02M 3/045 261/DIG. 74 |
| 3,534,721 | A | | 10/1970 | King |
| 3,640,257 | A | | 2/1972 | Cornelius |
| 3,664,774 | A | * | 5/1972 | Tupper et al. ...... F04B 53/1092 417/571 |
| 3,780,996 | A | | 12/1973 | Nutten |
| 3,783,849 | A | * | 1/1974 | Bramfitt ............. F02M 13/06 123/576 |
| 3,825,238 | A | | 7/1974 | Nishihara et al. |
| 3,834,676 | A | | 9/1974 | Miyazaki |
| 3,845,749 | A | | 11/1974 | Dale |
| 3,906,921 | A | | 9/1975 | Tillotson |
| 3,942,505 | A | | 3/1976 | Tillotson |
| 4,099,939 | A | | 7/1978 | Vancheri et al. |
| 4,111,176 | A | | 9/1978 | Fenton et al. |
| 4,316,355 | A | | 2/1982 | Hoff |
| 4,394,893 | A | | 7/1983 | Kronich |
| 4,416,107 | A | | 11/1983 | Hoff |
| 4,432,328 | A | * | 2/1984 | Shimizu ............. F02M 37/20 261/DIG. 67 |
| 4,437,448 | A | | 3/1984 | Billingsley |
| 4,456,216 | A | | 6/1984 | Boruta |
| 4,597,915 | A | * | 7/1986 | Nagase .............. F02M 5/10 261/DIG. 51 |
| 4,757,885 | A | | 7/1988 | Kronich |
| 4,770,822 | A | | 9/1988 | Sejimo |
| 4,893,593 | A | | 1/1990 | Sejimo et al. |
| 5,058,544 | A | | 10/1991 | Guntly et al. |
| 5,711,901 | A | | 1/1998 | Berg et al. |
| 5,732,685 | A | | 3/1998 | Nakamura |
| 5,750,056 | A | | 5/1998 | Pitman |
| 5,810,033 | A | | 9/1998 | Nakayama et al. |
| 5,836,290 | A | | 11/1998 | Gilbert |
| 5,894,833 | A | | 4/1999 | Kikuchi et al. |
| 6,000,369 | A | | 12/1999 | Koizumi |
| 6,029,619 | A | | 2/2000 | Mitchell |
| 6,082,323 | A | | 7/2000 | Winberg |
| 6,135,426 | A | * | 10/2000 | Wargolet ............ F02M 1/16 123/576 |
| 6,135,429 | A | * | 10/2000 | Woody ............... F02M 17/04 261/DIG. 68 |
| 6,158,368 | A | | 12/2000 | Nanami |
| 6,176,206 | B1 | | 1/2001 | Ishikawa et al. |
| 6,213,083 | B1 | * | 4/2001 | Winberg ............. F02D 17/04 123/198 DB |
| 6,227,176 | B1 | | 5/2001 | Hettmann |
| 6,244,572 | B1 | | 6/2001 | Delsole |
| 6,354,571 | B1 | | 3/2002 | Gerhardy |
| 6,374,810 | B1 | | 4/2002 | Pattullo |
| 6,425,573 | B1 | | 7/2002 | Suzuki |
| 6,439,548 | B1 | | 8/2002 | Masunaga |
| 6,446,939 | B1 | | 9/2002 | Hoppe et al. |
| 6,481,403 | B1 | | 11/2002 | Ashcraft et al. |
| 6,561,495 | B2 | | 5/2003 | Woody |
| 6,595,500 | B2 | | 7/2003 | Osburg et al. |
| 6,655,335 | B2 | | 12/2003 | Imafuku et al. |
| 6,672,571 | B2 | | 1/2004 | Gangler et al. |
| 6,715,737 | B2 | | 4/2004 | Galka et al. |
| 6,729,608 | B1 | | 5/2004 | Del |
| 6,866,019 | B1 | * | 3/2005 | Schmitz ............. F02M 1/14 123/344 |
| 6,895,914 | B2 | | 5/2005 | Rado et al. |
| 6,913,250 | B2 | | 7/2005 | Osburg et al. |
| 7,003,936 | B1 | | 2/2006 | Yue et al. |
| 7,017,557 | B2 | * | 3/2006 | Rumpf ............... B60K 15/077 123/509 |
| 7,165,536 | B2 | | 1/2007 | Kirk et al. |
| 7,210,441 | B1 | * | 5/2007 | Burns ................ F02D 35/0053 123/179.11 |
| 7,263,981 | B2 | | 9/2007 | Woody |
| 7,287,743 | B1 | | 10/2007 | Gliniecki |
| 7,424,884 | B2 | | 9/2008 | Woody |
| 7,467,785 | B2 | | 12/2008 | Braun |
| 7,568,472 | B2 | | 8/2009 | Woody |
| 7,600,505 | B2 | | 10/2009 | Pattullo |
| 7,690,342 | B2 | | 4/2010 | Gliniecki et al. |
| 7,775,189 | B2 | * | 8/2010 | Bejcek ............... F02D 35/0053 123/179.11 |
| 7,775,194 | B2 | | 8/2010 | Kono et al. |
| 7,913,659 | B2 | | 3/2011 | Maupin |
| 8,069,830 | B2 | | 12/2011 | Brown et al. |
| 8,141,544 | B1 | | 3/2012 | Bills |
| 8,308,144 | B2 | | 11/2012 | Saito |
| 8,347,913 | B2 | | 1/2013 | Zhu |
| 8,403,654 | B2 | | 3/2013 | Podesta et al. |
| 8,539,922 | B2 | | 9/2013 | Brown et al. |
| 8,550,050 | B2 | | 10/2013 | Taniguchi et al. |
| 8,631,777 | B2 | | 1/2014 | Brown et al. |
| 8,632,057 | B2 | | 1/2014 | Saito |
| 8,899,213 | B2 | | 12/2014 | Bejcek et al. |
| 8,925,509 | B2 | | 1/2015 | Warfel et al. |
| 9,033,682 | B2 | | 5/2015 | Thalmann |
| 9,038,356 | B2 | | 5/2015 | Shao et al. |
| 9,062,629 | B2 | | 6/2015 | Burns et al. |
| 9,062,630 | B2 | | 6/2015 | Kus |
| 9,103,299 | B2 | | 8/2015 | Warfel et al. |
| 9,433,147 | B2 | | 9/2016 | Schmalz |
| 9,462,747 | B2 | | 10/2016 | Schmalz |
| 9,562,495 | B1 | | 2/2017 | Tucak |
| 9,562,496 | B1 | | 2/2017 | Roberts et al. |
| 9,574,521 | B2 | | 2/2017 | Krup |
| 9,599,066 | B2 | | 3/2017 | Burns |
| 9,777,683 | B2 | | 10/2017 | Thomas |
| 2001/0013665 | A1 | | 8/2001 | Masunaga |
| 2001/0032601 | A1 | * | 10/2001 | Galka ................ F02M 17/04 123/73 A |
| 2002/0073671 | A1 | | 6/2002 | Kucera |
| 2002/0084117 | A1 | * | 7/2002 | Joseph .............. A01D 43/0631 180/19.3 |
| 2002/0135081 | A1 | * | 9/2002 | Woody ............... F02M 17/04 261/DIG. 68 |
| 2002/0135082 | A1 | * | 9/2002 | Woody ............... F02M 17/04 261/35 |
| 2003/0056481 | A1 | | 3/2003 | Trefz |
| 2003/0062633 | A1 | * | 4/2003 | Woody ............... F02M 1/16 261/37 |

(56) References Cited

U.S. PATENT DOCUMENTS

| | | | |
|---|---|---|---|
| 2005/0274364 A1* | 12/2005 | Kirk | F02M 25/0809 123/519 |
| 2006/0260587 A1 | 11/2006 | Woody | |
| 2008/0178850 A1* | 7/2008 | Bejcek | F02M 37/0052 123/517 |
| 2010/0280712 A1 | 11/2010 | Bowman | |
| 2011/0140290 A1 | 6/2011 | Kumagai | |
| 2011/0239965 A1* | 10/2011 | Ingelfinger | F01M 13/023 123/41.86 |
| 2013/0075174 A1 | 3/2013 | Jones, Jr. | |
| 2013/0111866 A1 | 5/2013 | Schmalz | |
| 2013/0119567 A1 | 5/2013 | Burns et al. | |
| 2013/0160740 A1 | 6/2013 | Kamimura et al. | |
| 2013/0206114 A1* | 8/2013 | Bejcek | F02M 5/085 123/517 |
| 2013/0212996 A1 | 8/2013 | Shao et al. | |
| 2014/0026854 A1 | 1/2014 | Lindstrom et al. | |
| 2014/0102064 A1 | 4/2014 | Tamaoka et al. | |
| 2014/0196688 A1* | 7/2014 | Chen | F02M 17/04 123/437 |
| 2015/0083090 A1 | 3/2015 | Warfel | |
| 2015/0152813 A1 | 6/2015 | Krup | |
| 2016/0040628 A1* | 2/2016 | Braun | F02M 17/42 137/7 |
| 2018/0119646 A1 | 5/2018 | Xue | |
| 2018/0274503 A1* | 9/2018 | Rotter | A01D 34/001 |

FOREIGN PATENT DOCUMENTS

| | | |
|---|---|---|
| CN | 104500273 A | 4/2015 |
| CN | 204299723 U | 4/2015 |
| CN | 205779309 U | 12/2016 |
| CN | 104481738 A | 4/2017 |
| CN | 206092212 U | 4/2017 |
| CN | 206280175 U | 6/2017 |
| EP | 2589284 A2 | 5/2013 |
| GB | 6101132 A | 10/1948 |
| JP | 03003955 A | 1/1991 |
| JP | 07008549 U | 2/1995 |
| JP | 2009180146 A | 8/2009 |
| JP | 2018053725 A | 4/2018 |
| WO | 2018155020 A1 | 8/2018 |

OTHER PUBLICATIONS

Chinese Office Action for Chinese Application No. 202010148439.4 dated Jul. 26, 2021.

* cited by examiner

62

62

BAIL DRIVEN STALE FUEL EVACUATION

CROSS-REFERENCE TO RELATED PATENT APPLICATION

This application is a continuation of application under 37 C.F.R. § 1.53(b) and 35 U.S.C. § 121 of U.S. patent application Ser. No. 16/293,149, filed Mar. 5, 2019, the entire disclosure of which is incorporated by reference in its entirety.

FIELD

This disclosure relates in general to a carburetor or a device that mixes fuel and air for an internal combustion engine, and more specifically, to apparatus and techniques for draining a bowl of a carburetor to remove stale fuel from the bowl.

BACKGROUND

A carburetor regulates the speed and volume of air drawn into an internal combustion engine, which controls the amount of fuel that is mixed with the air and provided to the combustion chamber of the internal combustion engine. The carburetor may include a bowl that houses a quantity of fuel at any given time when the engine is running so that fuel is always available and ready for mixing with the flow of air.

As a consequence of fuel in the bowl always available for use, some fuel may remain in the bowl after the engine is no longer running. Fuel that remains in the bowl for a long period of time may become stale. Long periods of time may occur during the off-season, for example, when an engine is not used during winter. Several problems may arise with stale fuel. The stale fuel may lose volatility and fail to provide sufficient combustion for operation of the engine. The stale fuel may at least partially evaporate and leave behind sediments or residue that clog components of the carburetor.

The apparatus and techniques described herein prevent or lessen the effects of stale fuel in the bowl of a carburetor.

BRIEF DESCRIPTION OF THE DRAWINGS

Exemplary embodiments are described herein with reference to the following drawings.

DETAILED DESCRIPTION

Figure 1:
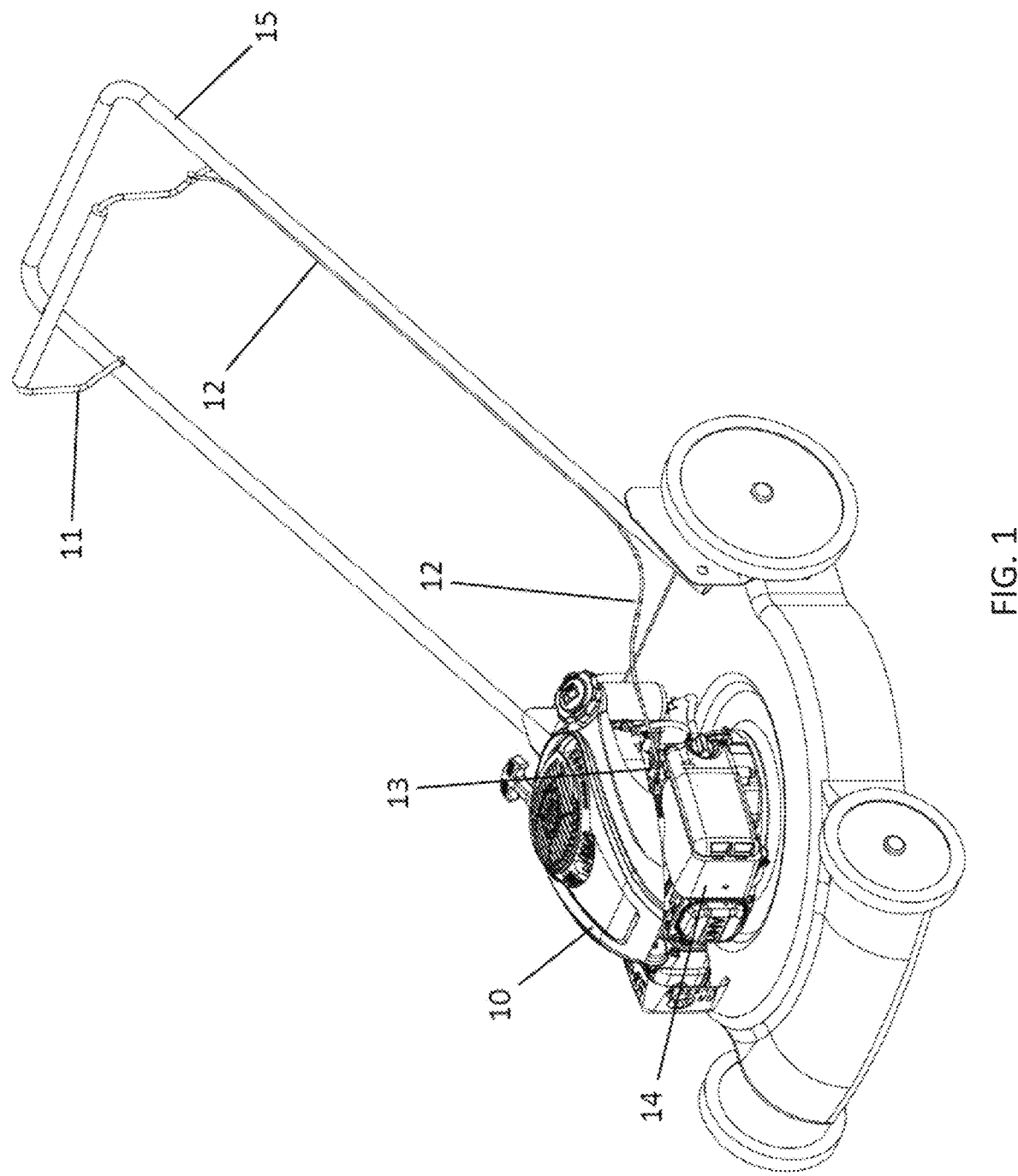
FIG. 1 illustrates an example lawnmower including an engine according embodiments described herein.

FIG. 1 illustrates an example lawnmower including an engine 10, a bail 11, an actuating cable 12, a brake system 13, and a carburetor 14. A drive shaft of the engine 10 may be coupled with a blade adapted to rotate under the force of the engine 10 to cut grass or other vegetation. The following embodiments may include one or more mechanisms to drain stale fuel or non-combustible fuel from a carburetor bowl of the engine 10. The stale or non-combustible fuel may have a volatility below a threshold value. The volatility of the fuel may be measured in Reid vapor pressure or an absolute vapor pressure of a chamber including the fuel that has not be evacuated. The volatility of the fuel may be directly related to the Reid vapor pressure. The absolute vapor pressure decreases due to factors such as time and heat. Starting an engine is more difficult as the absolute vapor pressure decreases. As the vapor pressure of a fuel decreases, the fuel is less volatile and less likely to vaporize. The low volatile fuel tends to create fuel droplets that do not evaporate readily in a cold combustion chamber (cold start condition). Thus, there may not be sufficient fuel vapor mixed with air to ignite when the sparkplug fires. High volatility fuel will readily evaporate in a cold combustion chamber. The evaporated gasoline will mix at a richer fuel concentration and readily ignite when the sparkplug fires. Other aspects are illustrated and the system may include additional, different, or fewer components.

The lawnmower may include one or more safety mechanisms that serve as an operator present control system. The operator present control system ensures that an operator is present. When no operator is present, the operator present control system disables the engine 10. For example, the operator present control system may cause the engine to stop running when no operator is present. Examples of an operator present control system include a hand operated bail, a weight operated seat, a safety clip, a force operated safety mechanism, a hand operated safety button, or another mechanism. Any of the embodiments described herein that utilize a hand operated bail may be modified to include any of these operator present control systems.

The hand operated bail may include a lever that a user holds in a position to maintain the running state of the engine. When the user releases the lever, the engine returns to a stopping state of the engine. The stopping state or stopping condition is the state of the engine after the stop command has been sent (e.g., by releasing the level) and may include the time when the engine is still turning and slowing down. The weight operated seat includes a switch that provides a signal to the engine to maintain a running state of the engine when someone is sitting in the seat. When the seated user stands or otherwise stops placing weight on the seat, the engine returns to the stopping state of the engine. The safety clip may clip to a user and the apparatus. When the safety is connected to the apparatus, the engine maintains the running state. When the safety clip is removed, for example, by the user falling or stepping away from the apparatus, the engine returns to the stopping state of the engine. The force operated or gravity operated safety mechanism may include an accelerometer or another sensor that determines whether the apparatus has been dropped or involved in an accident. When the force operated safety mechanism is trigged, the engine is stopped. The hand operated safety button may be a switch that is held in a first position for maintaining the engine in a running state and when released to a second position returns to a stopped state of the engine. The following embodiments may utilize any of these operator present control systems.

In the example illustrated in FIG. 1, the operator present control system is bail 11. The operator of the lawnmower holds the bail 11 toward or against the handle 15. The actuating cable 12 moves in a first direction when the bail 11 is held toward the handle 15 and the actuating cable 12 moves in a second direction when the bail 11 is released. The first direction may be a direction away from the engine 10 and the second direction may be a direction toward the engine 10. A spring may bias the actuating cable 12 in the first direction or the second direction.

The actuation cable 12 may actuate the brake system 13. When the actuating cable 12 moves in the first direction when the bail 11 is held towards the handle 15, the brake system 13 is placed in a release position. In the release position, a brake may be spaced apart from the flywheel. When the actuating cable 12 moves in the second direction when the bail 11 is released from the handle 15, the brake system 13 is placed in a braking position. In the braking position, a brake may be pressed against the flywheel.

Figure 2:
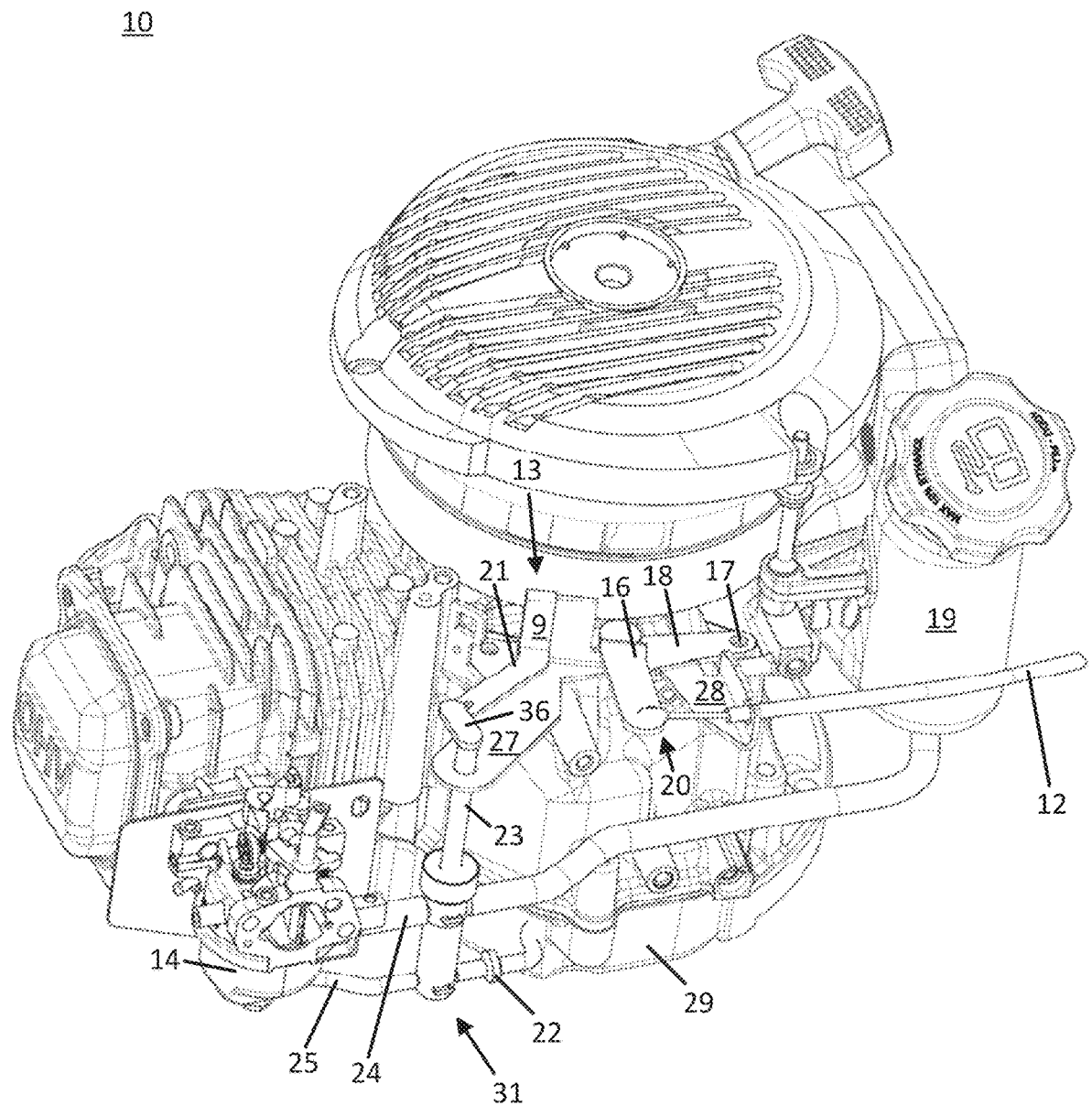
FIG. 2 illustrates an example engine with a carburetor bowl drain to a crank case.

FIG. 2 illustrates an example engine 10 with carburetor draining apparatus. The carburetor 14 includes a carburetor bowl that drains to a crank case of the engine 10. The carburetor bowl is configured to store fuel and provide the fuel to an air passage (e.g., a venturi) for mixing the fuel with an air flow. A fuel supply pipe 24 connects a fuel tank 19 and the carburetor bowl. A fuel drain pipe 25 connects the carburetor bowl to the crank case 29 of the engine 10. Additional, different, or fewer components may be included.

The actuation cable 12 may include a sheath and a tension wire extended through the sheath. The actuation cable 12 extends from the bail 11 to the bail assembly 20. The actuation cable 12 may be supported by a support bracket 28. The support bracket 28 may include a curved portion or a hole to support the actuation cable 12. The actuation cable 12 may be fed through the curved portion or the hole of the support bracket 28 and rigidly connected to the bail assembly 20. The sheath 12 is fixed to the support bracket 28 so that the tension wire moves relative to the sheath and the support bracket 28.

The brake system 13 may include a brake portion 9, a bail extension 18, a rigid mount portion 17, and a valve extension 21. The rigid mount portion 17 rigidly couples the brake system 13 to the engine 10. The rigid mount portion 17 may include one or more screws, bolts, or other connectors. The bail extension 18 may be integrated with the support bracket 28.

The bail extension 18 of the brake system 13 supports the bail assembly 20. The bail assembly 20 receives a force from the actuation cable 12 and applies a force to the brake system 13. Specifically, the bail assembly 20 (e.g., via a spring 34) provides a force to the brake portion 9 that moves the brake portion toward the flywheel 38. The brake portion is normally in contact with the flywheel 38 when the engine is not running. The brake portion 9 may include a brake shoe or brake pad. The brake portion 9 comes in and out of contact with the flywheel 38. A friction force between the brake portion 9 and the flywheel 38 slows the motion of the flywheel 38. When the bail 11 is released the actuation cable 12 allows the brake system 13, including the brake portion 9, to move against the flywheel 38, which causes the flywheel 38 to reduce speed.

The bail assembly 20 may include a bail interface 16 that extends from the brake system 13. The connection between the bail interface 16 and the brake system 13 may be adjustable. For example, there may be a rod in the bail interface 16 configured to connect to multiple receiving holes of the brake system 13, In another example, the angle between the bail interface 16 and the brake system 13 may be adjustable.

The bail interface 16 is configured to operate in response to actuation of the bail 11 and the actuation cable 12. The bail interface 16 may include a hook or a hole configured to connect to the actuation cable 12. The actuation cable 12 may be soldered or otherwise secured to the bail interface 16. When the bail interface 16 is rotated under the force received from the actuation cable 12, the brake system 13 is actuated to apply the braking force to the flywheel 38.

The bail interface 16 may also apply a force to the valve system. When the bail interface 16 is rotated under the force received from the actuation cable 12, a valve to drain the carburetor bowl of the carburetor 14. In the example illustrated in FIG. 2, a valve extension 21 is configured to move simultaneously with the brake portion 9. The valve extension 21 may include a bracket that extends from the brake portion 9 to a valve driving portion including a hold or a slot that engages the valve pivot 36. The valve pivot 36 includes a length that extends from the valve driving portion and forms a radius for rotating a valve shaft 23.

Figure 3A:
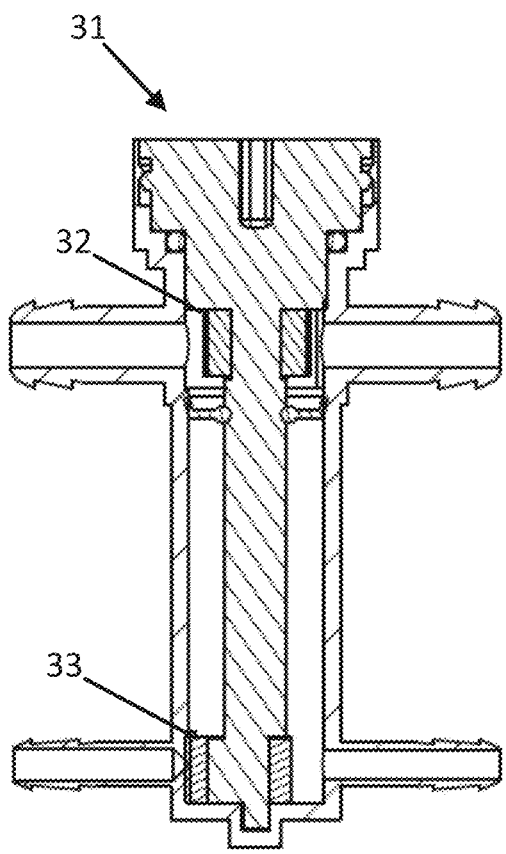
FIG. 3A illustrates an example flow restriction for the carburetor bowl drain of FIG. 2.
Figure 3B:
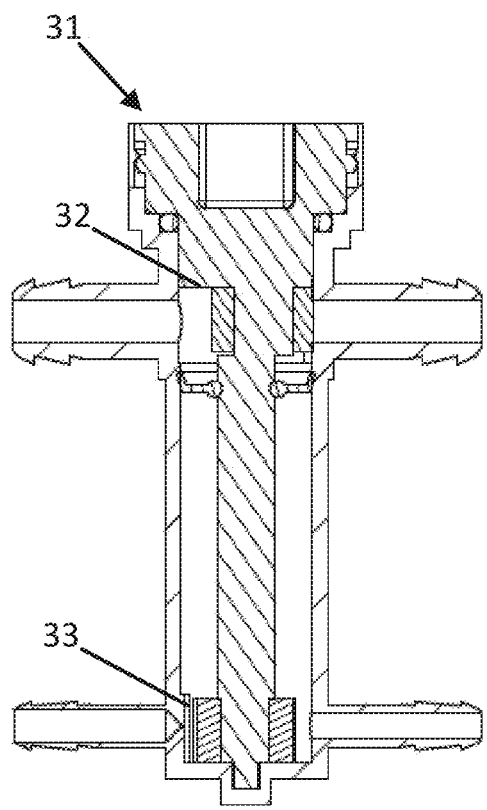
FIGS. 3B and 3C illustrate an example fuel tank valve and bowl drain valve for a combination valve.

FIGS. 3A and 3B illustrate the combination valve 31. The combination valve 31 includes the valve shaft 23 and at least one valve member. The at least one valve member includes a fuel tank valve 32 and/or a bowl drain valve 33. The at least one valve member may comprise a combination fuel valve that includes both the fuel tank valve 32 and the bowl drain valve 33. The combination fuel valve is a valve with multiple valve components associated with different flows or pipes. The multiple valve components are not associated with the same flow or pipe. That is the flow opened and closed by one of the multiple valve components is not connected with the flow opened and closed by another of the multiple valve components.

The valve 31 operates one of the valves (e.g., fuel tank valve 32) to open the fuel supply pipe in conjunction with the bail interface 16 and the actuation of the bail 11. The valve 31 operated another one of the valves (e.g., bowl drain valve 33) to open the fuel drain in conjunction with the bail interface 16 and the actuation of the bail 11.

Figure 3C:
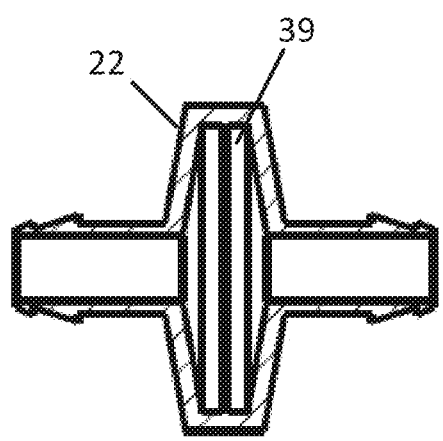

FIG. 3C illustrates an example flow restrictor 22 or flow limiter for the carburetor bowl drain of FIG. 2. The flow restrictor 22 is configured to slow a flow from the carburetor bowl of the carburetor 14 to the fuel tank 19.

The flow restrictor 22 may include a membrane 39. The membrane 39 may be permeable to the fuel but slow the flow of the fuel. The membrane 39 may have multiple layers. The membrane may be non-permeable or semi-permeable but include one or more orifices for the fuel to pass through the membrane 39. The flow restrictor 22 may include multiple plates with orifices for limiting the flow of the fuel.

Figure 4A:
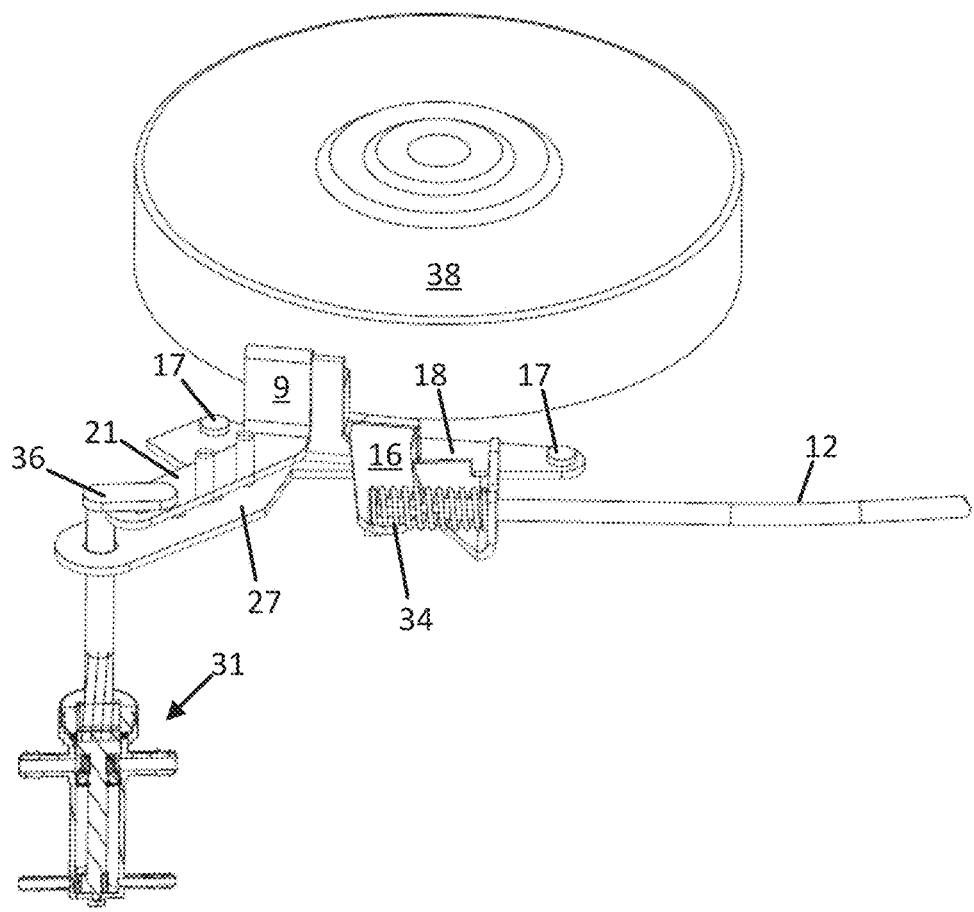
FIG. 4A illustrates an example of the bail assembly and brake in an engine running state.
Figure 4B:
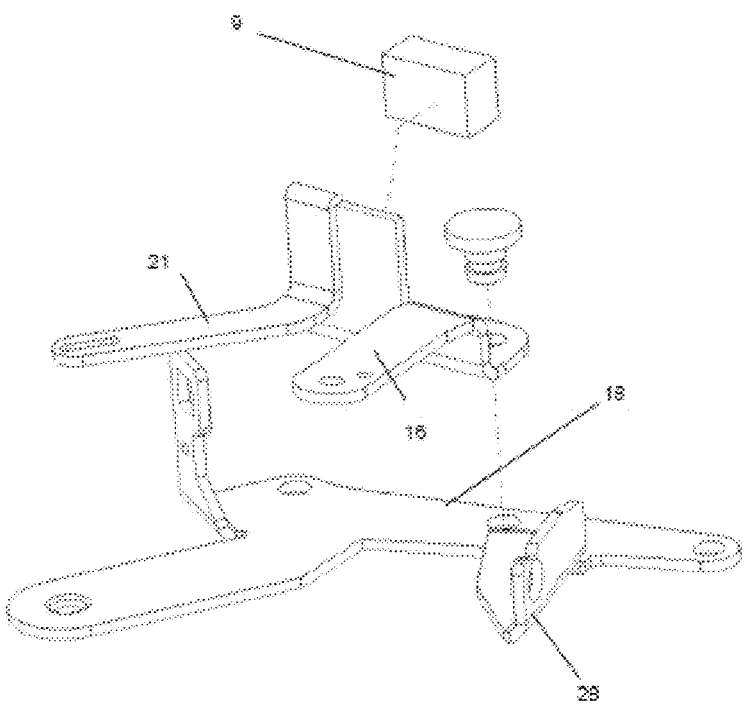
FIG. 4B illustrates an exploded view of the bail assembly and brake.

FIG. 4 illustrates an example of the bail assembly 20 in an engine running state. FIG. 4B illustrates an exploded view of the brake. When the bail 11 is held against the handle or otherwise held or pulled closed, the bail assembly 20 is rotated in a counter-clockwise direction by the actuator cable 12, for example, left to right in FIG. 4. A spring 34 may couple the bail assembly 20 to the actuator cable 12. When the actuator cable 12 is pulled by the bail 11, the spring 34 is compressed (e.g., placed in a first compression state), and the spring 34 applies the force to the bail assembly 20. In addition, the brake portion 9 (e.g., brake shoe) is moved away from the flywheel 38 by the force from the actuator cable 12 through the spring 34. In addition, the combination valve 31 is placed in an engine running state, when the actuator cable 12 is pulled by the bail 11, and the engine running state for the combination valve 31. The combination valve 31 in the engine running state includes an open valve that allows fuel flow from the fuel tank to the carburetor 14 and a closed valve that closes the flow path leaving the carburetor bowl.

Figure 5:
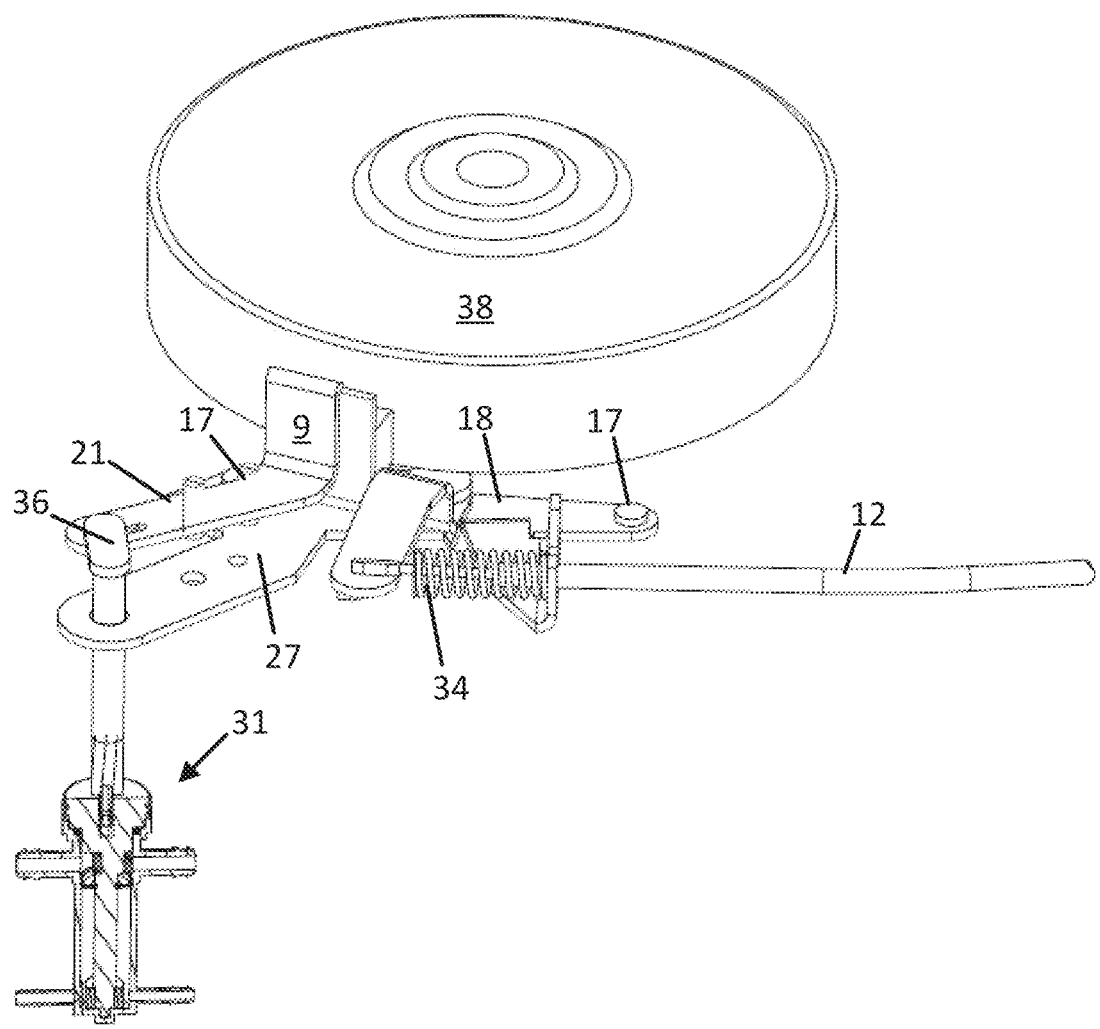
FIG. 5 illustrates an example of the bail assembly and brake in an engine stopped state.

FIG. 5 illustrates an example of the bail assembly 20 in an engine stopped state. When the bail 11 is released or otherwise pushed open, the bail assembly 20 is rotated in a clockwise direction by the actuator cable 12 or by the spring 34, for example, right to left in FIG. 5. When the actuator cable 12 is pulled by the bail 11, the spring 34 is decompressed (e.g., placed in a second compression state), and the spring 34 applies the force to the bail assembly 20. In addition, the brake portion 9 (e.g., brake shoe) is moved toward from the flywheel 38 by the force from the spring 34. In addition, the combination valve 31 is placed in an engine stopped state, when the bail 11 is released, through the same force from the spring 34. The combination valve 31 in the engine stopped state includes a closed valve that prevents fuel flow from the fuel tank to the carburetor 14 and an opened valve that open the flow path leaving the carburetor bowl.

Figure 6:
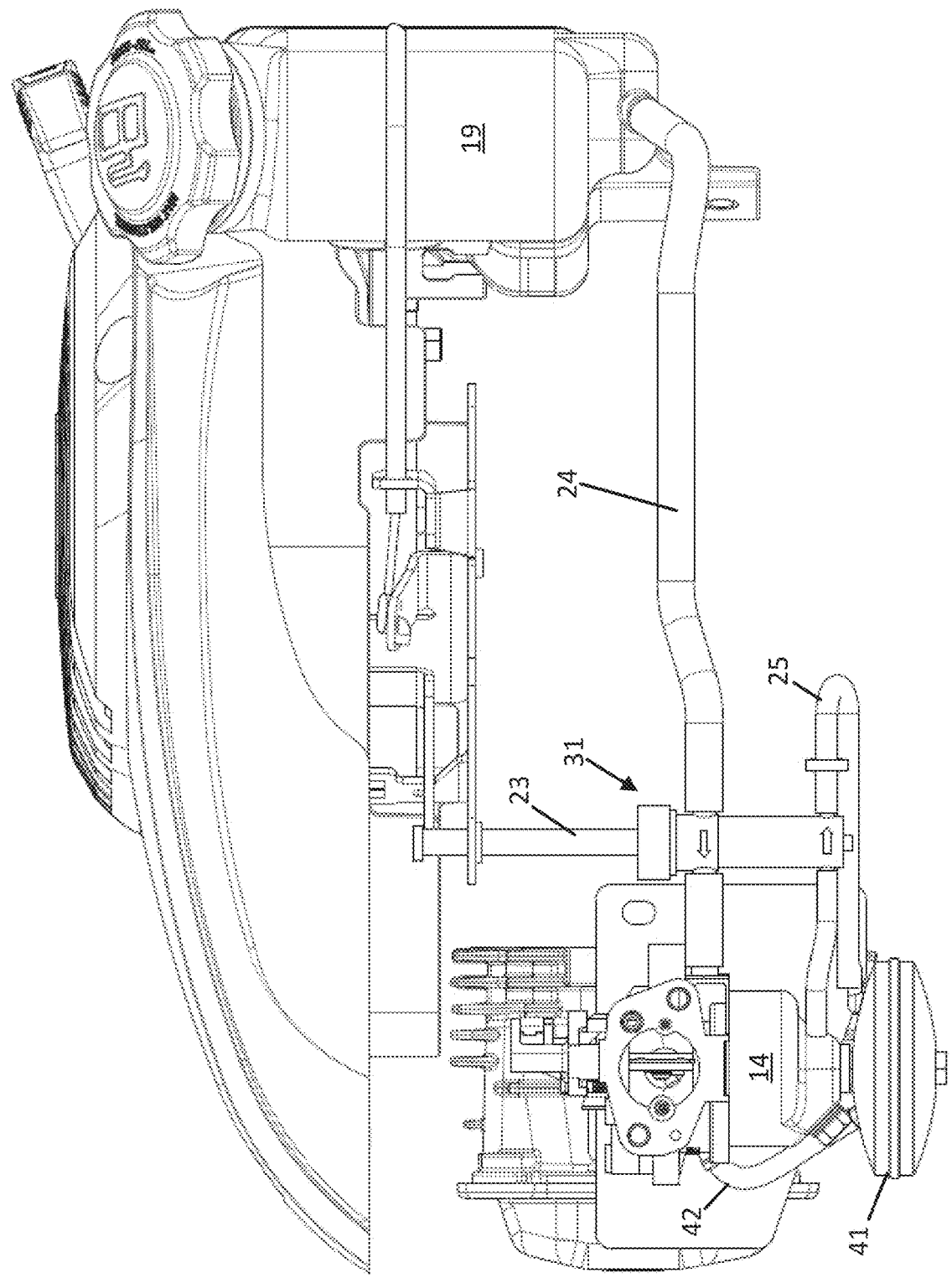
FIG. 6 illustrates an example of a drain system including a reservoir and aspirator.
Figure 7:
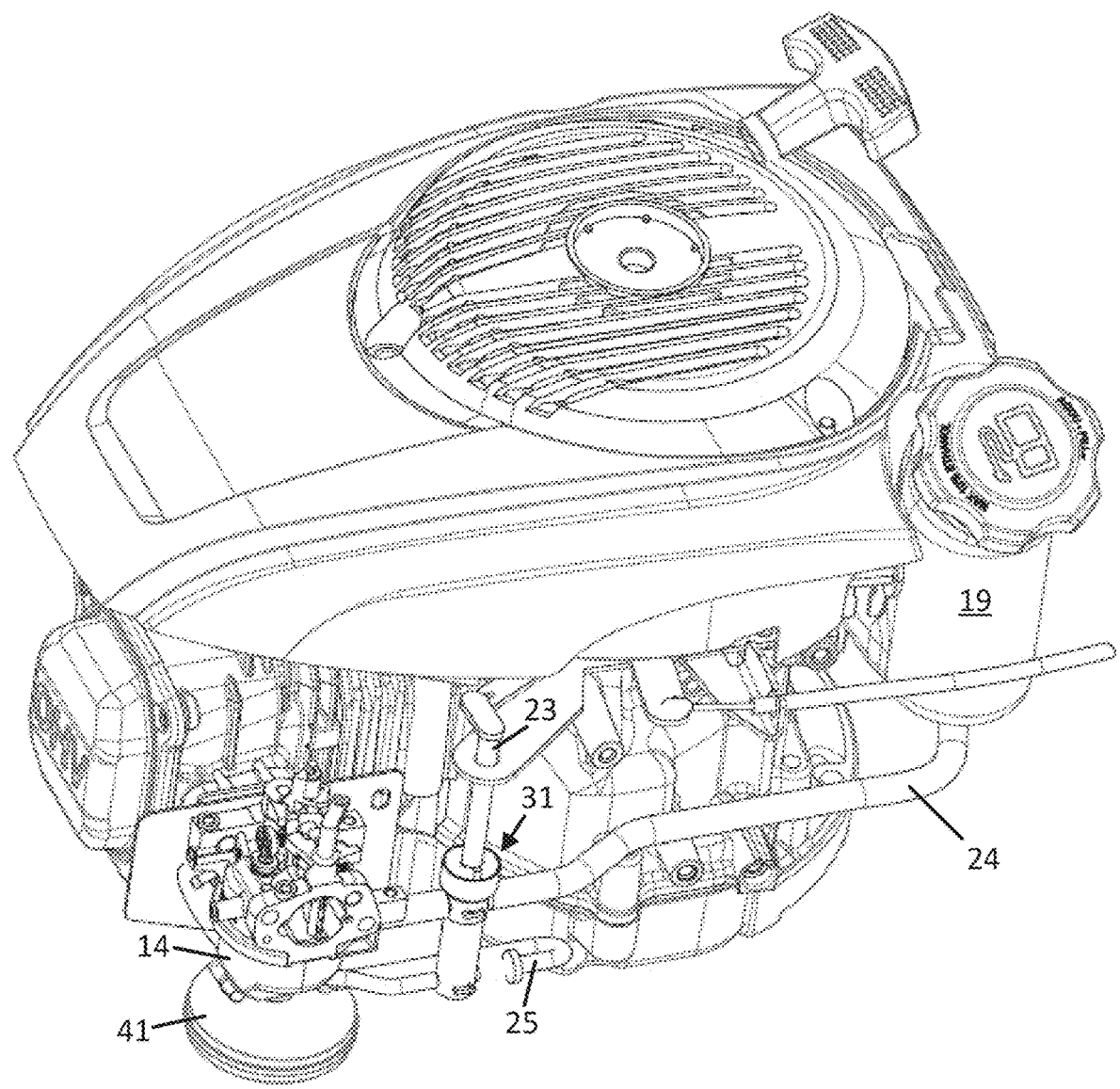
FIG. 7 illustrates a perspective view of the drain system of FIG. 6.

FIG. 6 illustrates an example of a drain system including a reservoir and aspirator. The aspirator may be a type of injector pump. The aspirator may include a tube with a first cross sectional area and a second cross sectional area that is smaller than the first cross sectional area. The different in cross sectional area a vacuum is generated through a venturi effect. The aspirator may be implemented by aspiration hose 42 as illustrated in FIG. 6. FIG. 7 illustrates a perspective view of the drain system of FIG. 6.

Figure 8A:
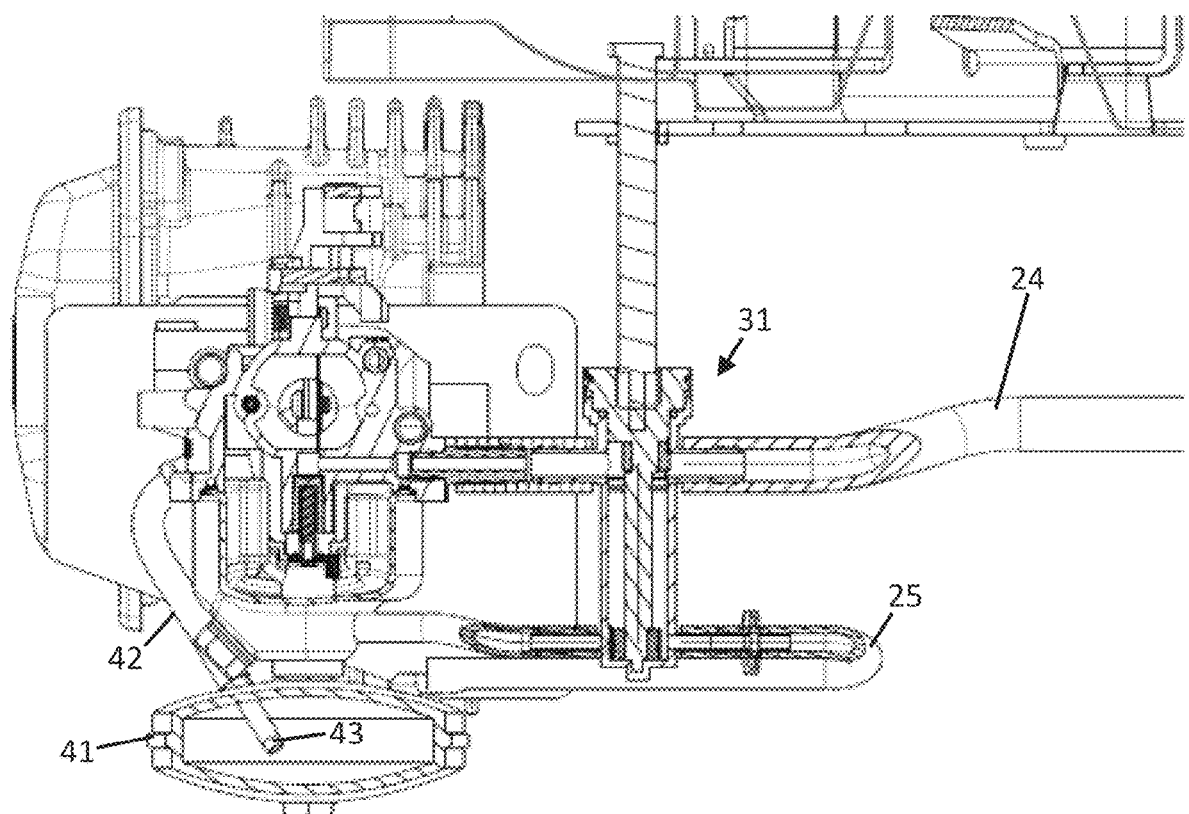
FIG. 8A illustrates a more detailed view of the aspirator of FIG. 6.
Figure 8B:
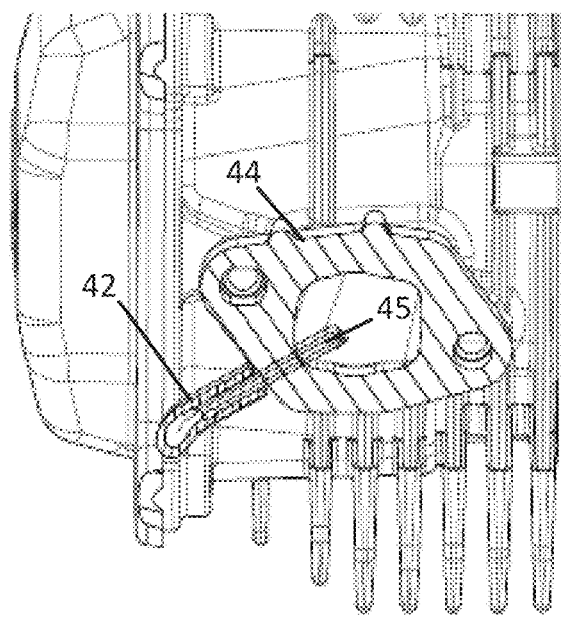
FIG. 8B illustrates an example mixer tube of a carburetor manifold in the drain system of FIG. 6.

A reservoir 41 is configured to store fuel drained from the carburetor bowl via the fuel drain pipe 25. The aspiration hose 42 provides the stored fuel from the reservoir to the carburetor venturi or downstream of the carburetor venturi. FIGS. 8A and 8B illustrate the aspirator exit in the heat resistant carburetor spacer placed between the carburetor and the intake port face. The aspiration hose 42 may include an extension as a fuel pick up tube or drawing tube 43 that extends into the reservoir 41. The drawing tube 43 is configured to draw the stored fuel from the aspirator and the reservoir 41. A mixing tube 45 extends from the aspiration hose 42 into a carburetor manifold 44 of the carburetor 14 and mixes the fuel drawn through the drawing tube 43 from the reservoir 41. A flow of combustion air through the carburetor manifold 44 creates a drop in pressure in the aspiration hose 42 that draws fuel from the reservoir 41 and mixes the fuel with air stream in the carburetor intake manifold 44 and intake port.

Figure 9:
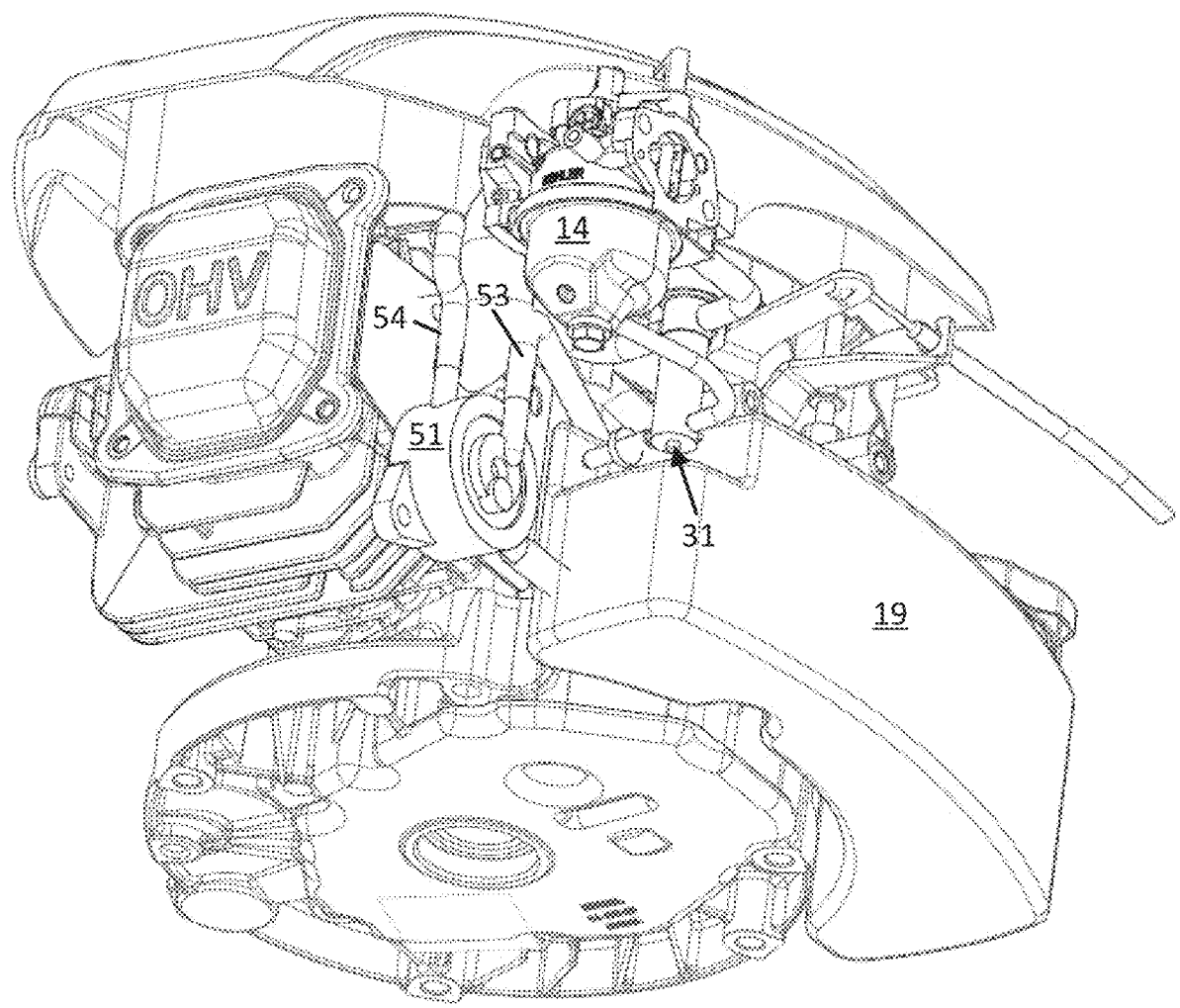
FIG. 9 illustrates an example drain system including a wheel driven fuel pump.
Figure 10:
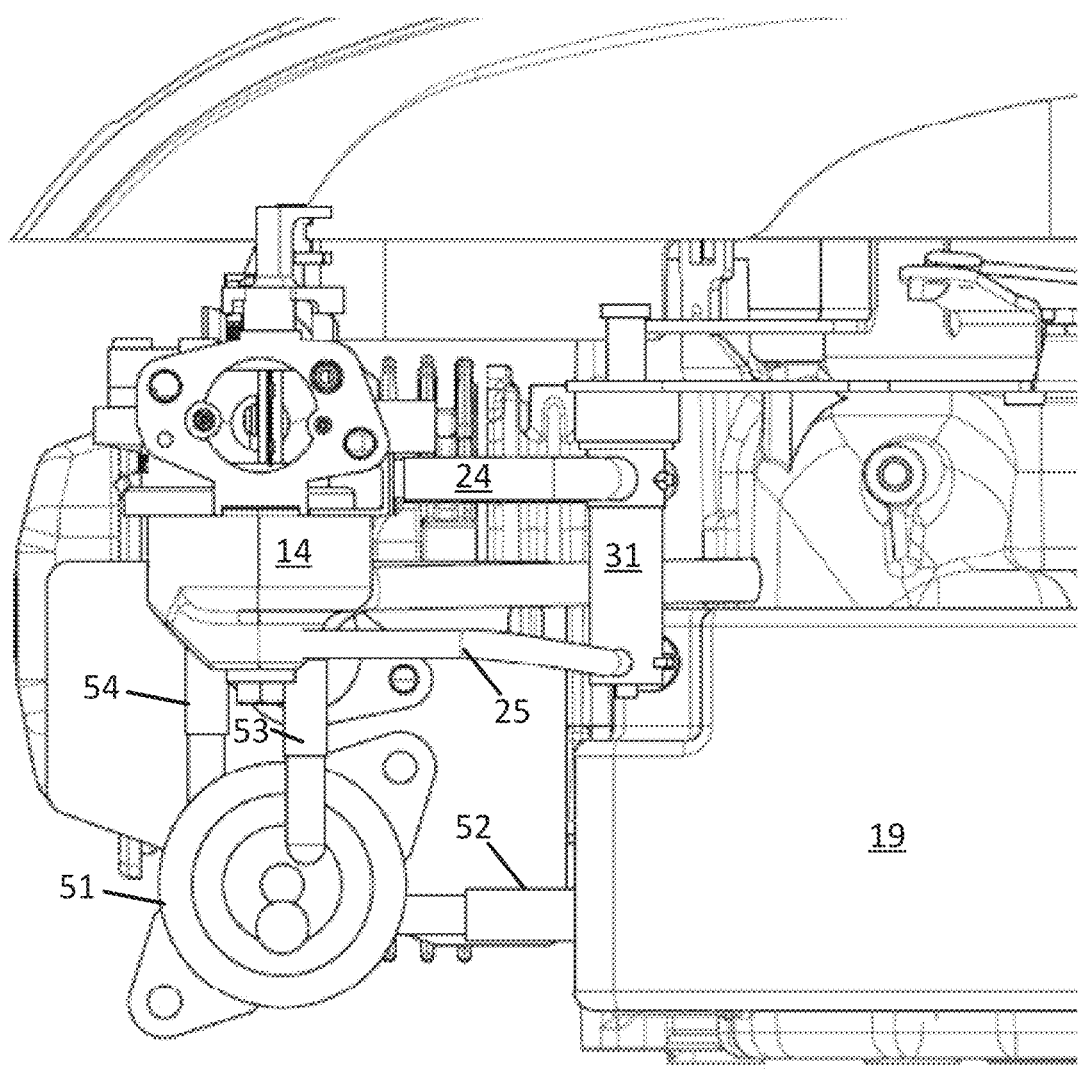
FIG. 10 illustrates another view of the drain system of FIG. 9.
Figure 11A:
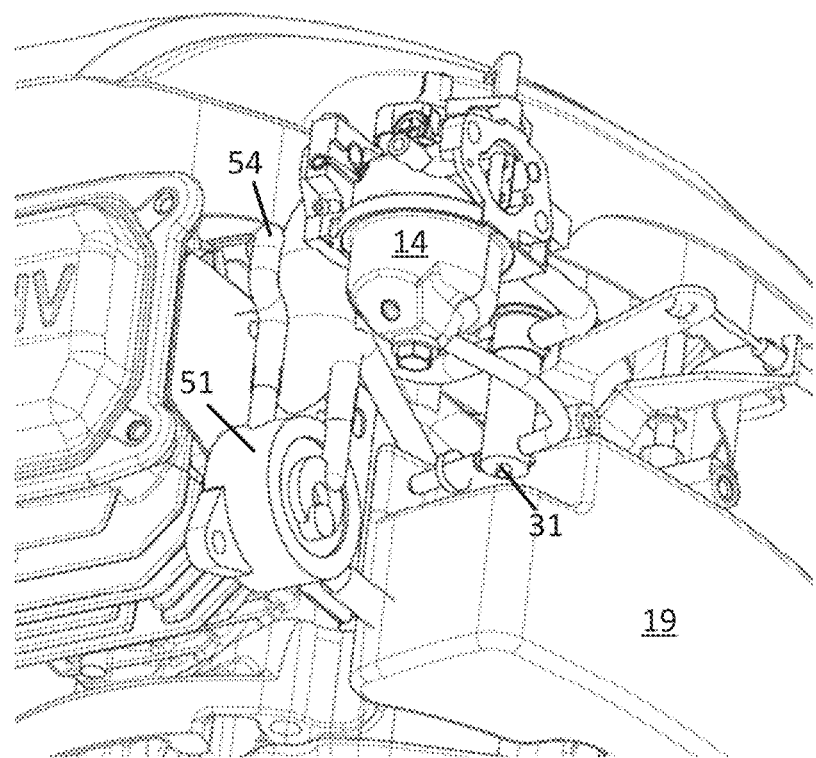
FIG. 11A illustrates a bottom view of the drain system of FIG. 9.
Figure 11B:
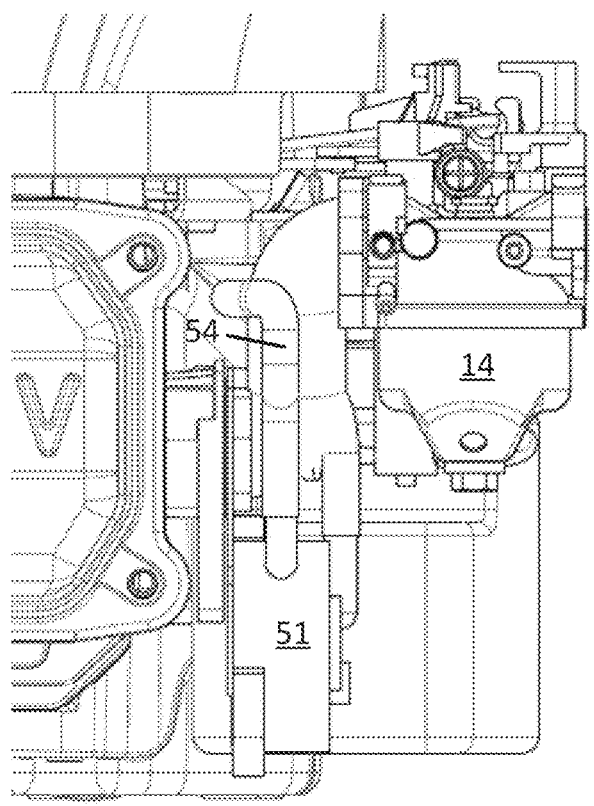
FIG. 11B illustrates a side view of the drain system of FIG. 9.

FIG. 9 illustrates an example drain system in which the carburetor 14 is drained to the fuel tank 19. FIG. 10 illustrates another view of the drain system of FIG. 9. FIG. 11A illustrates a bottom view of the drain system of FIG. 9. FIG. 11B illustrates a side view of the drain system of FIG. 9. Additional, different, or fewer components may be included.

The drain system also includes a fuel pump 51 that includes multiple ports connected to hoses or tubes. A fresh fuel hose 52 connects the fuel tank 19 to the fuel pump 51. The fresh fuel hose 52 carries fresh fuel from the fuel tank to the fuel pump 51, which pumps the fresh fuel to the carburetor 14. The fuel pump lifts the fuel from the fuel tank 19 to the carburetor 14 in the absence of a gravity feed, which may be substituted in some embodiments.

A fuel pump vacuum pulse hose 53 is connected between the fuel pump 51 and the engine. The fuel pump vacuum pulse hose 53 provides air pressure to operate the fuel pump 51. In the engine, the reciprocating motion of the piston changes the crankcase volume. The air in the crankcase alternates between positive pressure and a vacuum. This pulsed air pressure signal is transmitted to the fuel pump through the vacuum pulse hose 53. The fuel pump 51 has a chamber bisected with a flexible diaphragm. One side of the diaphragm receives the pressure pulses. The other side of the diaphragm is connected to the fuel system. The pressure pulses cause the diaphragm to move. The vacuum pulse moves the diaphragm to create a greater volume in the fuel side of the cavity and thus draws in fuel from a reservoir such as the fuel tank 19 and toward the carburetor. A positive pressure pulse moves the diaphragm to create a smaller volume on the fuel side and pushes fuel out of the pump. A pair of check valves control the direction from the tank to the carburetor.

A carburetor supply hose 54 provides fuel to the carburetor 14 from the fuel pump 51. The carburetor supply hose 54 extends from the fuel pump 51 between the cylinder head and the intake manifold to the fuel inlet fitting of the carburetor, which is not illustrated FIG. 9.

The combination valve 31 operates in association with the fuel pump 51. When the fuel tank valve 32 is opened by the bail interface 16 to allow flow in the fuel supply pipe 24 to flow to the carburetor 14, the fuel pump 51 is configured to pump fuel into the carburetor bowl. When the bowl drain valve 33 is opened by the bail interface 16 to allow flow in the fuel drain 25, the fuel pump 51 is configured to stop functioning. The fuel pump 51 does not operate when the engine 10 stops. Therefore, there is no fuel flowing through the fuel pump 51 and no fuel being pumped from the fuel pump 51 to the carburetor bowl.

On shut down, the combination valve 31 allows fuel in the carburetor bowl to drain back into the fuel tank 19. A flow control valve may provide a slow flow rate (e.g., in excess of 30 minutes or an hour) of fuel from the bowl to the tank 19 (hours vs seconds). This improves engine starting after momentary stops, such as, in the case of a lawnmower, when an operator stops to empty the grass catching bag.

Figure 12:
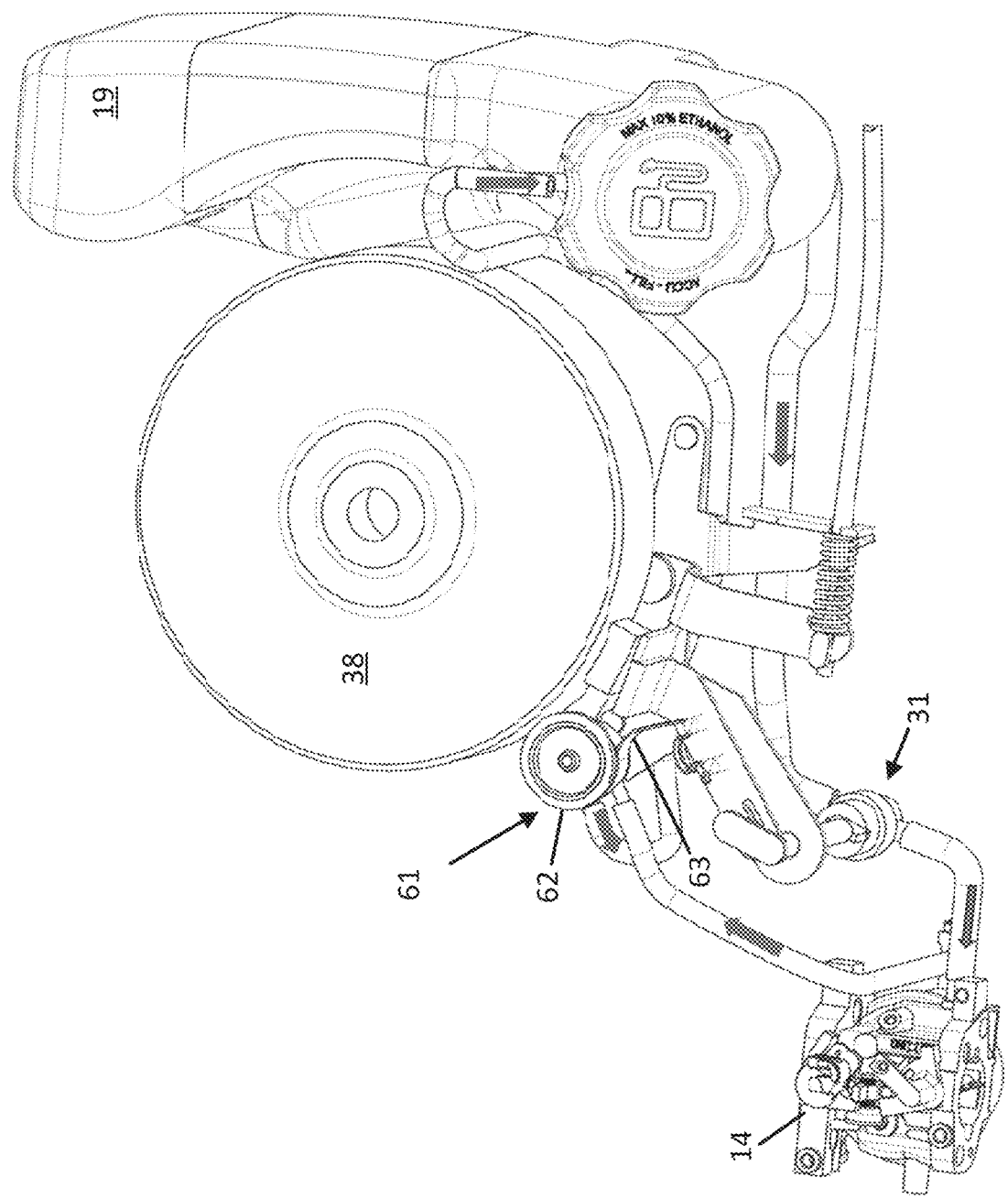
FIG. 12 illustrates an example drain system including a wheel driven pump.

FIG. 12 illustrates an example drain system including a wheel driven pump assembly 61. Additional, different, or fewer components may be included.

The wheel driven pump assembly 61 supports a driven wheel in contact with the flywheel 38 when the engine is in a stop position and supports the driven wheel out of contact with the flywheel 38 when engine is in a run position.

The driven wheel rotates at the same or similar circumferential speed when the driven wheel is in contact with the flywheel 38. The wheel rotates at a speed ratio relative to the diameters of the driven wheel and the flywheel 38. When the bail is released, the ignition ceases (ignition module is grounded) and the brake is applied. The engine may coast to a stop in a specific amount of time that correspond to a predetermined number of flywheel revolutions. In one example the specific amount of time is approximately 3 seconds, which corresponds to approximately 20 flywheel revolutions. In addition, there may be a non-linear decay of flywheel rotational speed. The driven wheel does not rotate when the driven is out of contact with the flywheel 38.

The wheel driven pump assembly 61 includes a fuel pump 62 rotated by the driven wheel and configured to pump fuel from the carburetor bowl of the carburetor 14. Fuel from tank 19 is provided to the carburetor 14 through the combination valve 31 as the engine is running. When the engine is stopped, fuel in the carburetor 14 is pumped by the fuel pump to back to the fuel tank 19 to evacuate the carburetor bowl.

The wheel driven pump assembly 61 may also include a spring bracket 63. The driven wheel and/or fuel pump 62 is biased toward the flywheel 38 by the spring bracket 63. That is, the spring bracket 63 places a force on the driven wheel that tends to move the driven wheel toward the flywheel 38. When the rotation of the wheel driven pump assembly 61 allows for the driven wheel to contact the flywheel 38, the spring bracket 63 keeps the surfaces in contact so that the rotation is efficiently applied to the driven wheel.

Figure 13A:
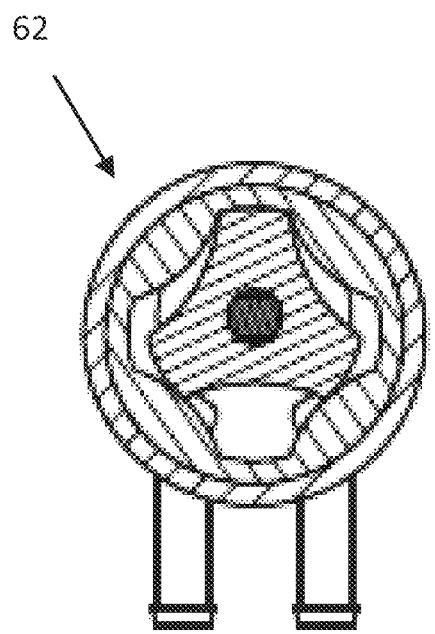
FIG. 13A illustrates the wheel driven pump of FIG. 12.
Figure 13B:
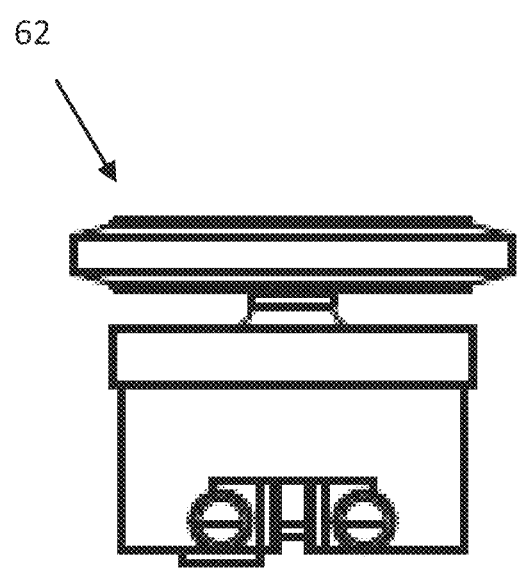
FIG. 13B illustrates a side view of the wheel driven pump of FIG. 12.

FIG. 13A illustrates the fuel pump 62 of FIG. 12. FIG. 13B illustrates a side view of the fuel pump 62 of FIG. 12. The fuel pump 62 includes multiple rotors in a cavity coupled to the carburetor bowl and coupled to the fuel tank 19. The rotors may be impellers or other types of rotors. The rotors increase the pressure of the fluid (e.g., fuel) flowing through the fuel pump 62.

Figure 14A:
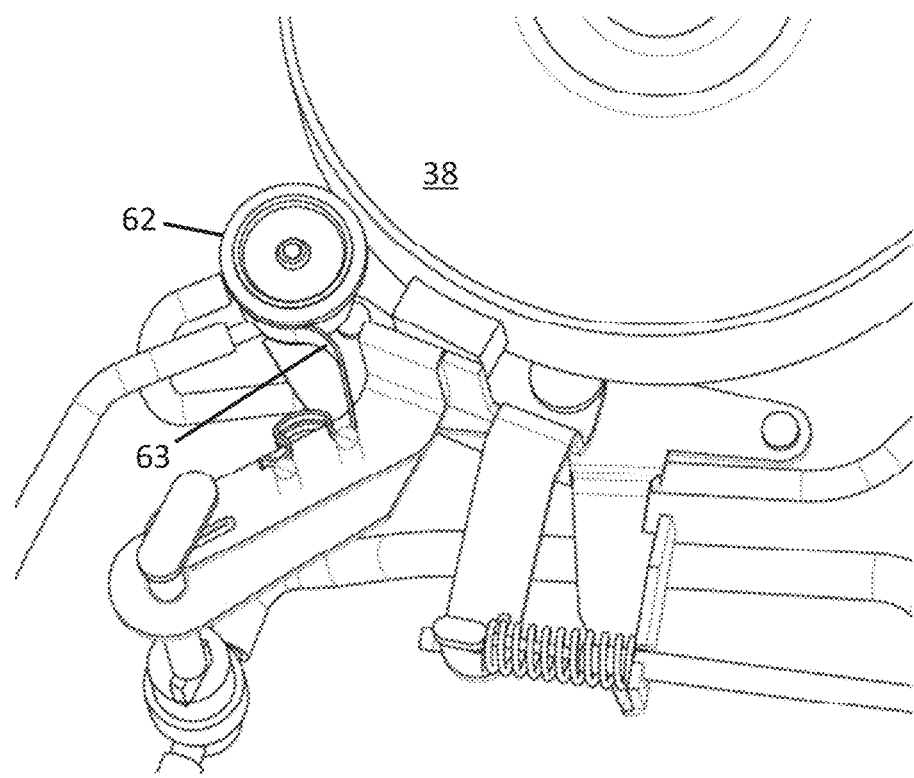
FIG. 14A illustrates the wheel driven pump of FIG. 12 when the engine is in a stop position.
Figure 14B:
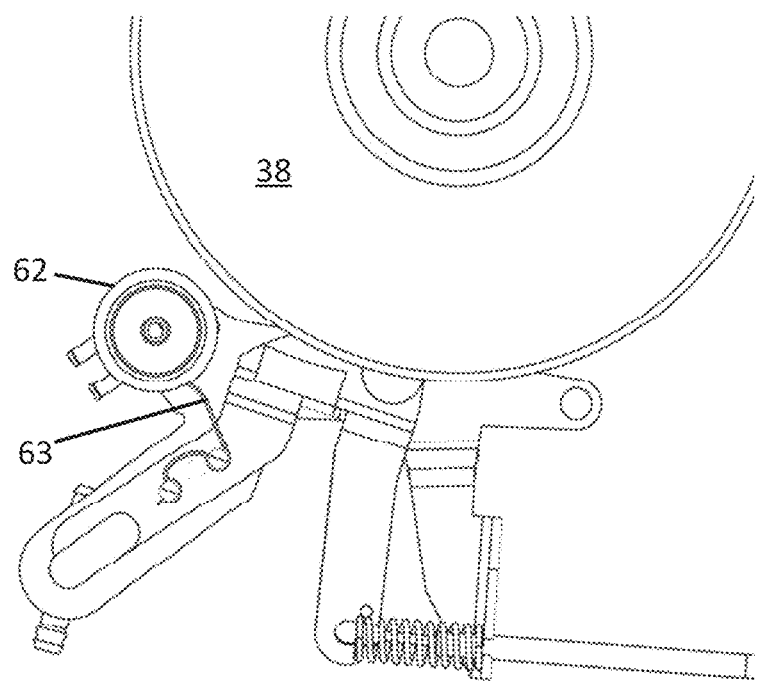
FIG. 14B illustrates the wheel driven pump of FIG. 12 when the engine is in a stop position.

FIG. 14A illustrates the wheel driven pump of FIG. 12 when the engine is in a stop position. FIG. 14B illustrates the wheel driven pump of FIG. 12 when the engine is in a running position. When the bail 11 is held against the handle or otherwise held or pulled closed, the wheel driven pump assembly 61 is rotated in a counter-clockwise direction by the actuator cable 12 or through the spring 34 when released by the actuator cable 12, for example, toward the flywheel 38. When the bail 11 is released or otherwise pushed open, wheel driven pump assembly 61 is rotated in a clockwise direction by the actuator cable 12 or through the spring 34 when released by the actuator cable 12, for example, away from the flywheel 38.

The wheel driven pump assembly 61 may change position in coordination with the opening and closing of the combination valve 31 and/or the brake portion 9. In an engine running state, when the bail 11 is held against the handle or otherwise held or pulled closed, the bail assembly 20 is rotated in a counter-clockwise direction by the actuator cable 12 and the wheel driven pump assembly 61 is placed out of contact with the flywheel. In response, the brake portion 9 (e.g., brake shoe) may be moved away from the flywheel 38 by the force from the actuator cable 12. Also in response, the combination valve 31 is placed in an engine running state including an open valve that allows fuel flow from the fuel tank to the carburetor 14 and a closed valve that closes the flow path leaving the carburetor bowl.

When the bail 11 is released or otherwise pushed open, the bail assembly 20 is rotated in a clockwise direction by the actuator cable 12 and the wheel driven pump assembly 61 is placed in contact with the flywheel. In response, the brake portion 9 (e.g., brake shoe) is moved toward from the flywheel 38. In addition, the combination valve 31 is placed in an engine stopped state, when the bail 11 is released, and includes a closed valve that prevents fuel flow from the fuel tank to the carburetor 14 and an opened valve that open the flow path leaving the carburetor bowl.

The fuel pump 62 of the wheel driven pump assembly 61 is driven by the flywheel 38, as the flywheel 38 is slowing down (i.e., in the process of being stopped by the brake portion 9). The flywheel 38 rotates a number of times before it reaches the stopped position. In one example, the number of times that the flywheel 38 rotated before stopping is 10 or 20 rotations. The number of reciprocations of the fuel pump 62 depends on the number of rotations of the flywheel 38 after the brake is applied before the flywheel comes to a complete stop. The number of reciprocations for the fuel pump 62 sufficient to empty the carburetor bowl may be determined based on the size of the carburetor bowl and the size of the fuel pump 62 (e.g., size of the carburetor bowl/size of the fuel pump).

Figure 15:
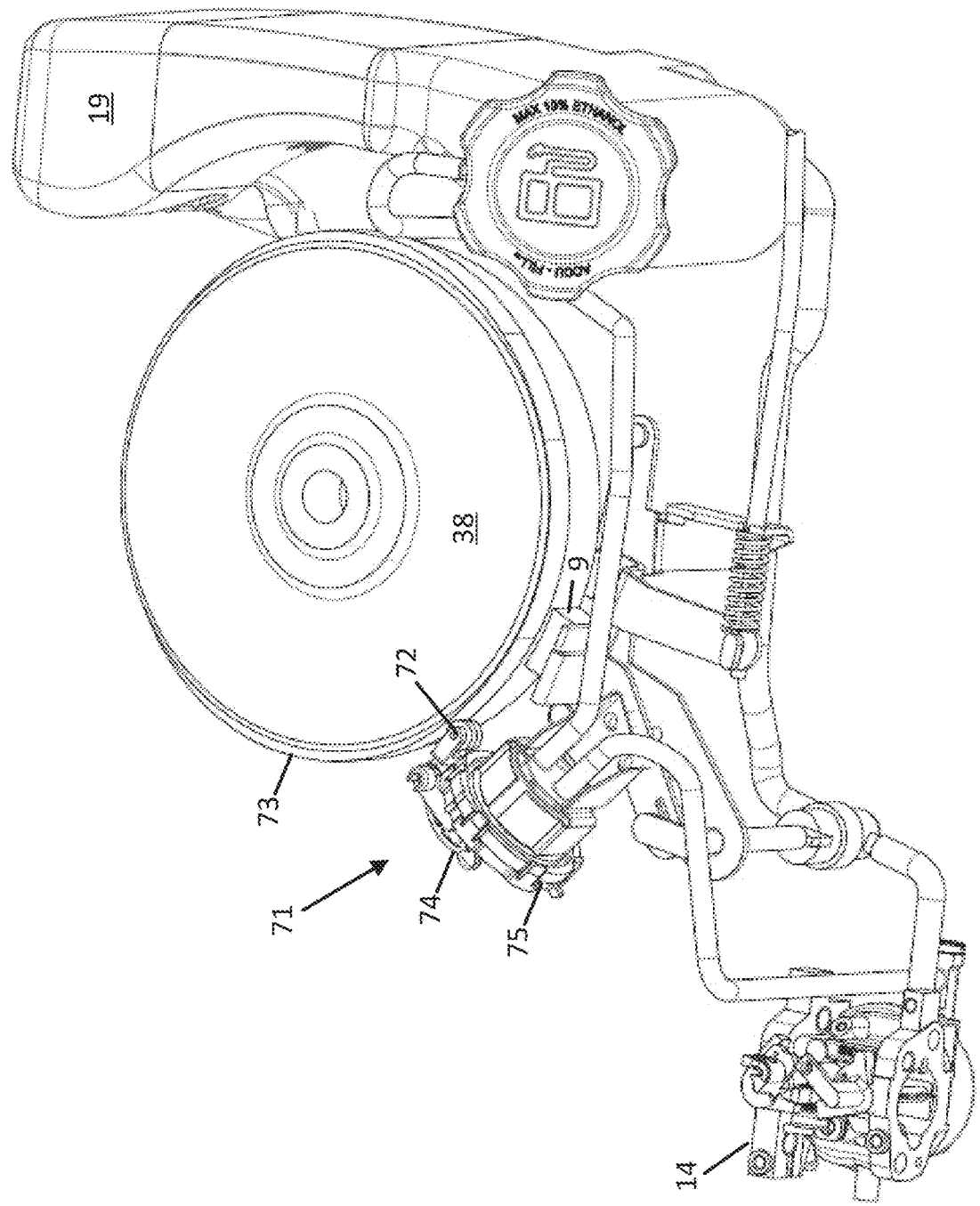
FIG. 15 illustrates an example drain system including a reciprocating fuel pump.

FIG. 15 illustrates an example drain system including a reciprocating fuel pump assembly 71. The reciprocating fuel pump assembly 71 includes an idle wheel 72, a reciprocating member 74 and a fuel pump 75. Additional, different, or fewer components may be included.

The idle wheel 72 is configured to contact the flywheel 38. However, rotation of the idle wheel 72 does not operate the fuel pump assembly 71. Instead, the idle wheel 72 is pushed to oscillate in a radial direction with respect to the flywheel 38 by the one or more cams 73 of the flywheel 38. The cams 73 change the shape, for example, the diameter, of the flywheel 38. Therefore, the idle wheel 73 rides along (e.g., up and down) the cams 73 in order to oscillate in the radial direction. The oscillation of the idle wheel moves the reciprocating member 74. The reciprocating member 74 may be an arm that reciprocates between a first position and a second position. In the first position the idle wheel 72 is in a counter clockwise position closer to a center of the flywheel 38. In the second position the idle wheel 72 in in a clockwise position father from the center of the flywheel 38 due to the cam 73. Reciprocating between the first position and the second position, a pump piston 76 drives the fuel pump 75 to pump fuel from the carburetor bowl 14.

Figure 16:
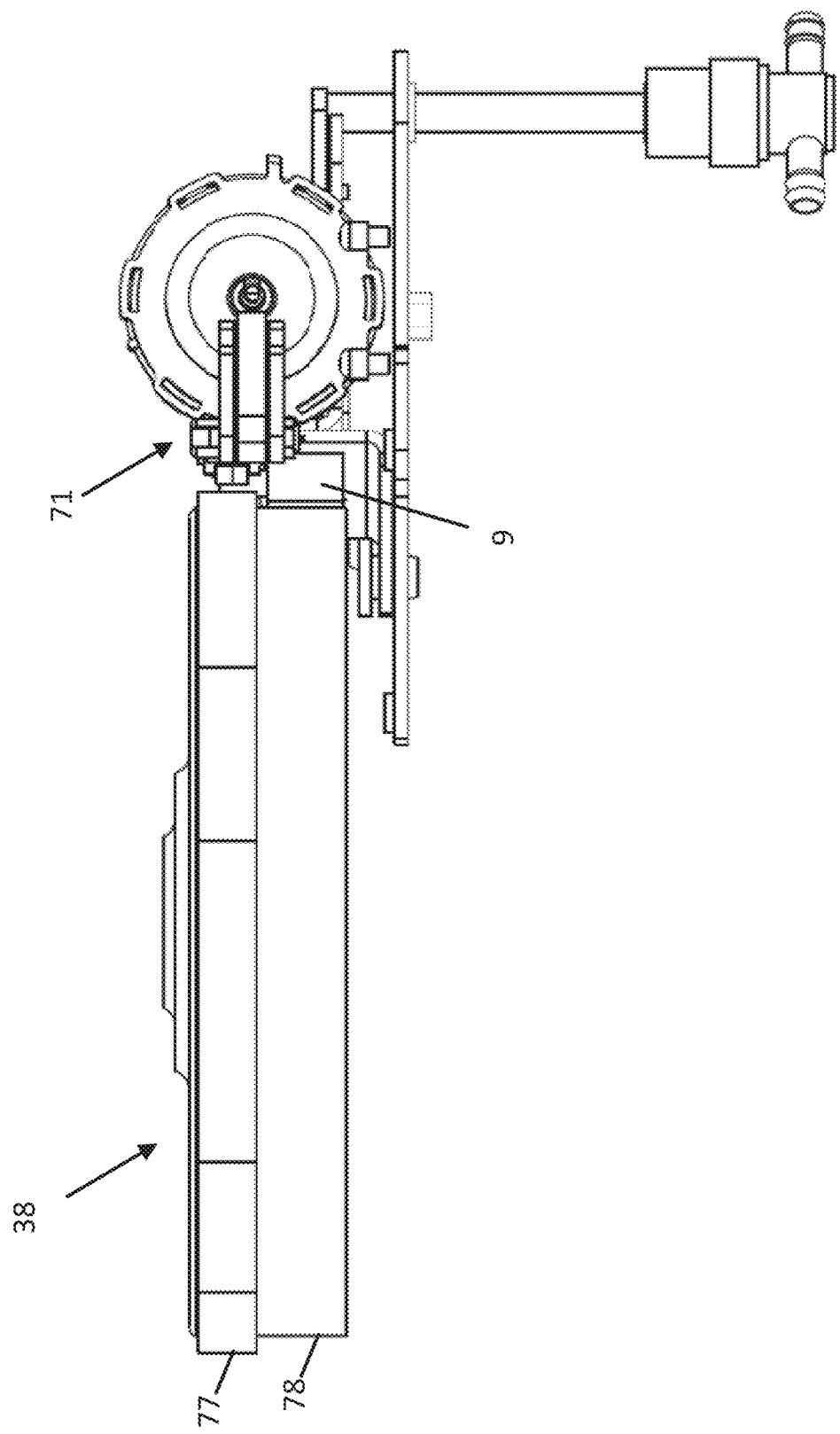
FIG. 16 illustrates a flywheel for the reciprocating fuel pump of FIG. 15.

FIG. 16 illustrates a flywheel 38 for the reciprocating fuel pump of FIG. 15. The flywheel 38 may include multiple circumferential surfaces. A first surface 77 may include one or more of the cams 73 for moving the idle wheel 72 in the radial direction for driving the fuel pump 75. A second surface 78 may include a brake plate configured to contact the brake portion 9. That is, the brake plate and the brake portion 9 create high friction between the opposite movements of their respective surfaces for slowing or stopping the flywheel 38. Separate surfaces prevent wear and damage (e.g., scoring or roughness) caused by the brake shoe on the cams 73 on the first surface 77.

Figure 17A:
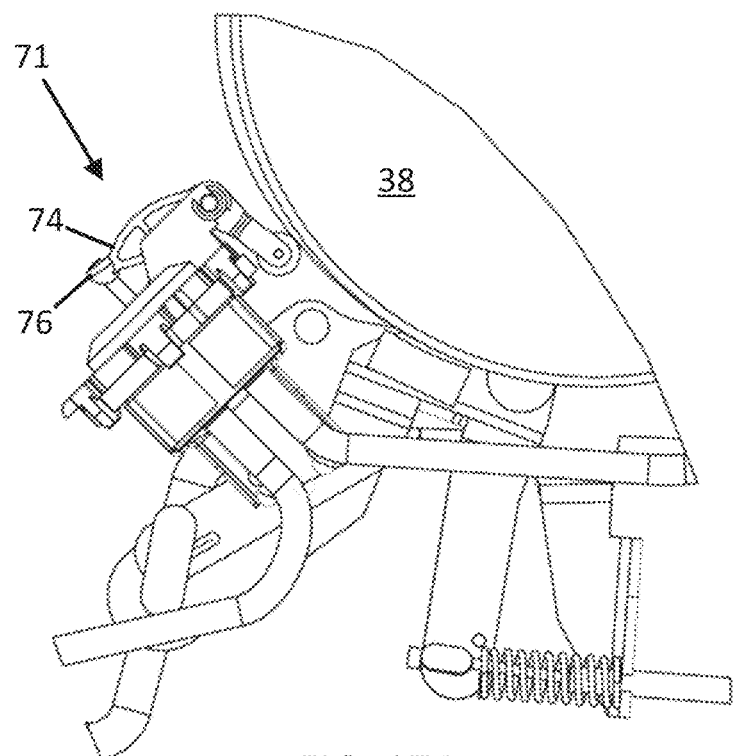
FIG. 17A illustrates the reciprocating fuel pump of FIG. 15 when the engine is in a stop position.
Figure 17B:
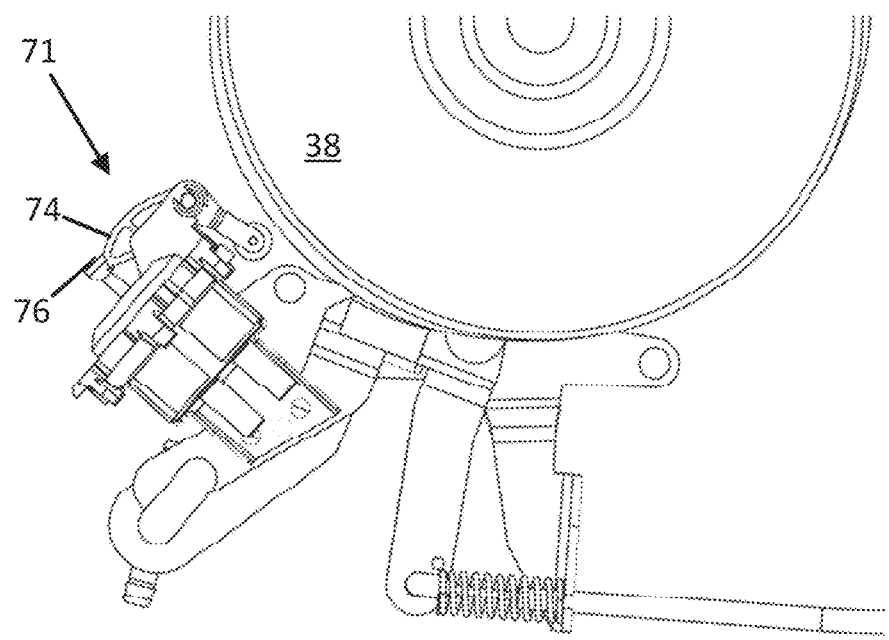
FIG. 17B illustrates the reciprocating fuel pump of FIG. 15 when the engine is in a run position.

FIG. 17A illustrates the reciprocating fuel pump of FIG. 15 when the engine is in a stop position. FIG. 17B illustrates the reciprocating fuel pump 75 of FIG. 15 when the engine is in a run position. The reciprocating pump assembly 71 is configured to support the reciprocating member 74 in contact with the flywheel 38 when the engine is in a stop position and support the driven wheel 72 out of contact with the flywheel 38 when engine is in a run position.

The reciprocating fuel pump of FIG. 15 may be operated in tandem with the combination valve 31. The reciprocating fuel pump may be operated at the same time and in response to the bail 11 being held against the handle. When the bail 11 is held in the run position, the reciprocating pump assembly 71 is held away from the flywheel 38, as illustrated in FIG. 17B. Thus, actuating the actuation cable 12 via the bail 11 moves the reciprocating pump assembly 71 away from the flywheel 38, moves the brake portion 9 away from the flywheel 38, and places the combination valve 31 in an engine running state that allows fuel flow from the fuel tank to the carburetor 14 and closes the flow path leaving the carburetor bowl.

When the bail 11 is released to the stop position, the reciprocating pump assembly 71 is moved toward the flywheel 38. As the flywheel 38 is slowing down (i.e., in the process of being stopped by the brake portion 9), the flywheel 38 rotates a number of times before it reaches the stopped position. In one example, the number of times that the flywheel 38 rotated before stopping is 10 or 20 rotations. The number of reciprocations of the reciprocation member 74 depends on the number of cams 73 on the flywheel 38 and the number of rotations of the flywheel 38 after the brake is applied before the flywheel comes to a complete stop. The number of reciprocations for the fuel pump 75 sufficient to empty the carburetor bowl may be determined based on the size of the carburetor bowl and the size of the fuel pump 75 (e.g., size of the carburetor bowl/size of the fuel pump). The number of cams 73 on the flywheel 38 may be selected based on the ratio of the size of the carburetor bowl and the size of the fuel pump.

In addition, the reciprocating pump assembly 71 is moved toward the flywheel 38 at the same time and in coordination with changing the combination valve 31. The combination valve 31 is placed in an engine stopped state, when the bail 11 is released, to cause the combination valve 31 to close at least one valve that prevents fuel flow from the fuel tank to the carburetor 14 and open at least one valve that provides the flow path leaving the carburetor bowl.

Figure 18:
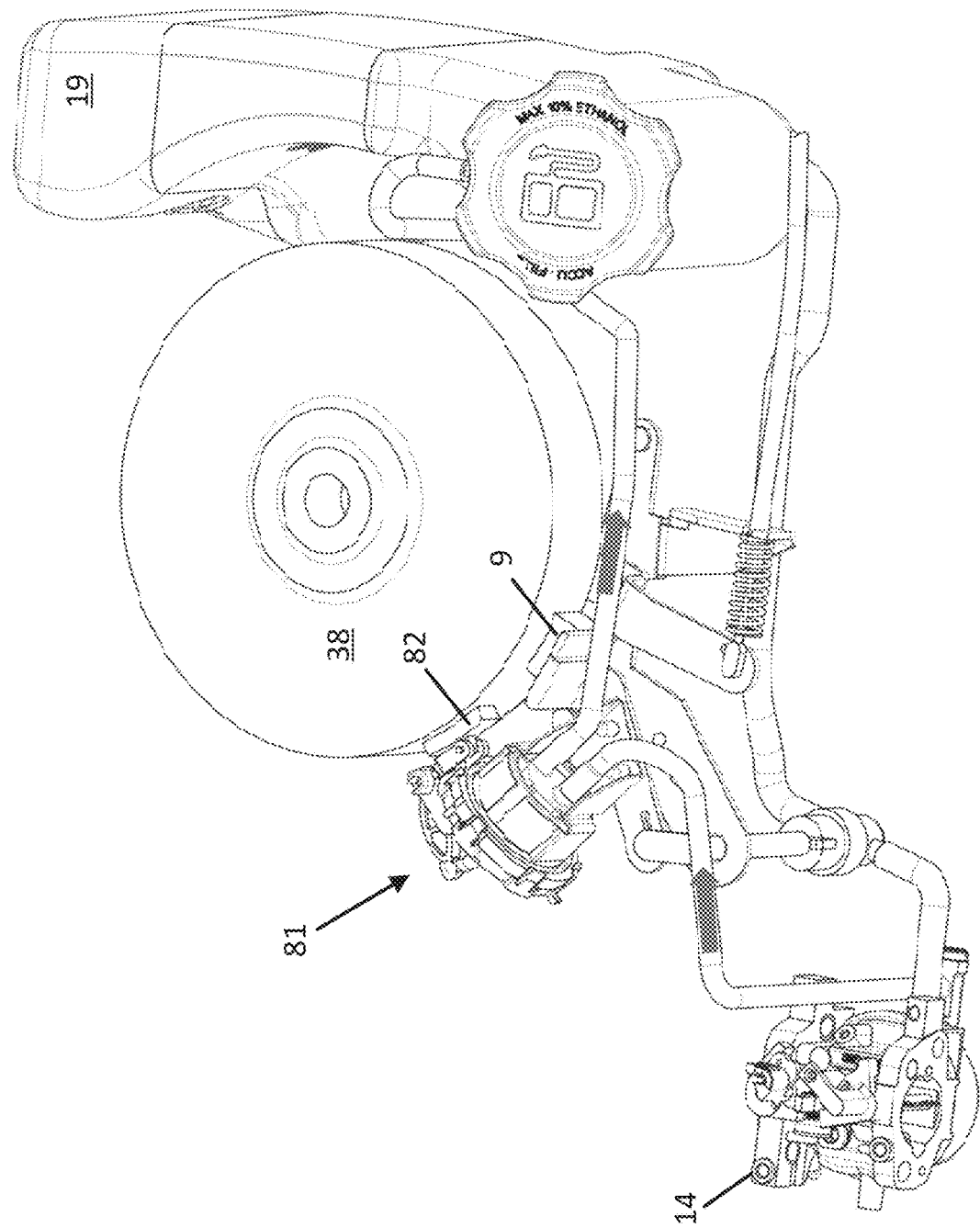
FIG. 18 illustrates an example drain system including a magnetically driven pump.

FIG. 18 illustrates an example drain system including a magnetically driven pump. A magnetically driven pump assembly 81 includes a magnetic shoe 82, a reciprocating member 84, and a pump piston 86. The magnetic shoe 82 is coupled to the reciprocating member 84 such that the magnetic shoe 82 and the reciprocating member 84 receive a force from a rotating magnet of the flywheel 38. The rotating magnet may be attached to the flywheel 38 or integrated with the flywheel. Addition, different, or fewer components may be included.

The magnetically driven pump assembly 81 is configured to interact with the rotating magnet. The rotating magnet may be a magnet or coil that is mounted on the outside or inside of the flywheel 38. In one example, the rotating magnet is ignition magnet 83 that provides a current for an ignition system of the engine. The ignition system may include a coil and at least one spark plug. As the ignition magnet 83 passes the coil, a current is induced and provided to the spark plug to provide a spark for an ignition of the engine.

The rotating magnet rotates with the flywheel 38 and causes the magnetic shoe 82 to move in response to a magnetic force between the rotating magnet and the magnetic shoe 82. Each of the rotating magnet and the magnetic shoe 82 includes at least one magnetic pole adjacent to the other of the rotating magnet and the magnetic shoe 82 at one or more positions as the rotating magnet passes the magnetic shoe 82. The magnetic force may cause the magnetic shoe 82 to move radially toward and away from the flywheel 38 as the rotating magnet passes. In one example, the rotating magnet provides a single force to push the magnetic shoe 82 away from the flywheel 38, and the magnetic shoe 82 returns to its initial position through a spring bias. In another example, the rotating magnet includes two poles that pass the magnetic shoe 82. In this example, a first pole provides a repelling force to the magnetic shoe 82 and a second pole provides an attracting force to the magnetic shoe 82.

In both examples, the magnetic shoe 82 effectively reciprocates and provides a reciprocating force to the reciprocating member 84. The reciprocating member 84 may be an arm that reciprocates between a first position and a second position. In the first position the magnetic shoe 82 is closer to a center of the flywheel 38. In the second position the magnetic shoe 82 is father from the center of the flywheel 38. In another example, the first and second positions may be arranged in the circumferential direction of the flywheel 38 such that the magnetic shoe 82 reciprocates in a place parallel to the surface of the flywheel 38 or at a particular angle. Reciprocating between the first position and the second position, the pump piston 86 drives the fuel pump 88 to pump fuel from the carburetor bowl 14.

As shown in FIG. 18, both the brake portion 9 and the magnetic shoe 82 are aligned with the circumferential surface of the flywheel 38. The flywheel includes a first area to align the rotating magnet of the flywheel 38 with the magnetic shoe 82 of the reciprocating member 84 and a second area to align a breaking surface of the flywheel 38 with the brake. As shown in FIG. 18, the first area and the second area are spaced apart in a lateral direction of the flywheel. However, in another example, the first area and the second area may overlap such that the braking surface of the flywheel 38 is the same as the area where the magnetic shoe 82 and the rotating magnet are aligned. In this example, where the first area and the second area overlap in a lateral direction of the flywheel 38, the brake portion 9 and the magnetic shoe 82 are aligned with the same portion of the flywheel 38 and aligned with each other along a circumferential line with respect to the flywheel 38.

Figure 19A:
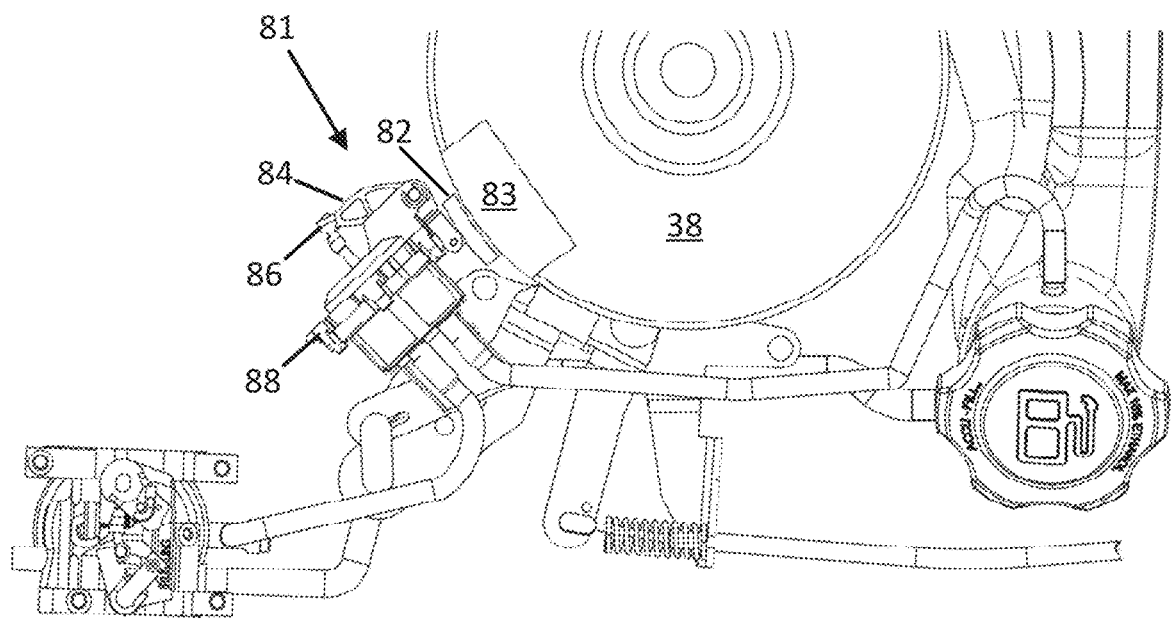
FIG. 19A illustrates the magnetically driven pump of FIG. 18 when the engine is in a stop position.
Figure 19B:
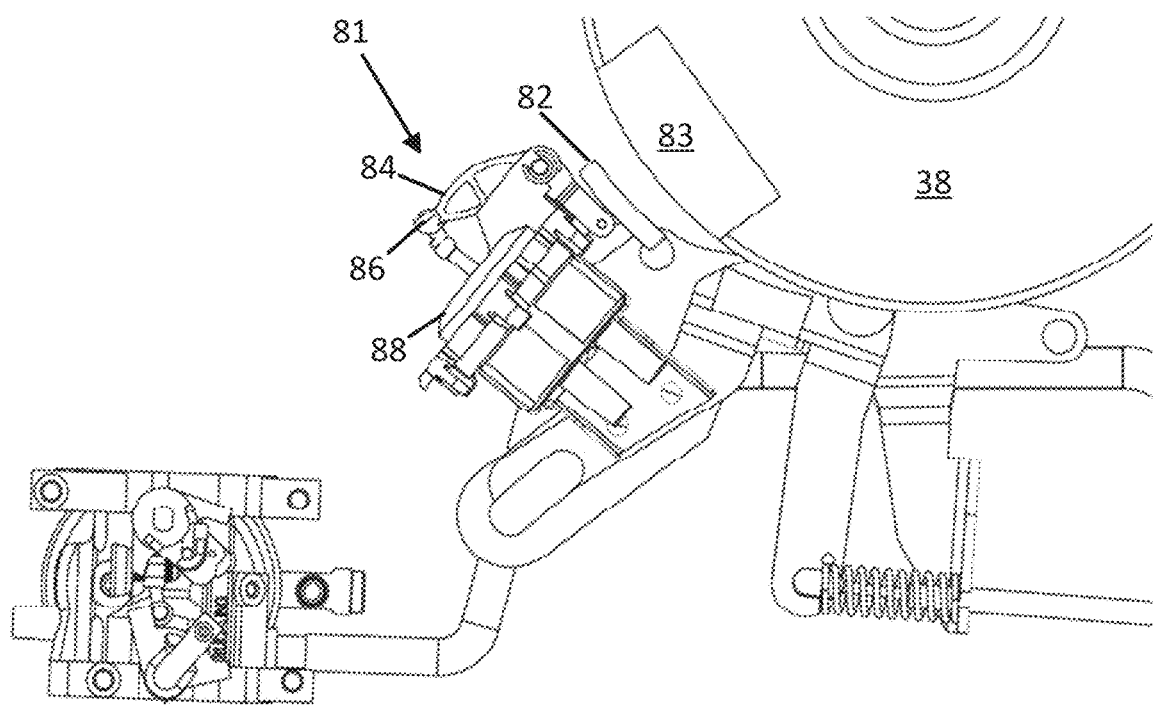
FIG. 19B illustrates the magnetically driven pump of FIG. 18 when the engine is in a run position.

FIG. 19A illustrates the magnetically driven pump of FIG. 18 when the engine is in a stop position. FIG. 19B illustrates the magnetically driven pump of FIG. 18 when the engine is in a run position.

The magnetic pump assembly 81 is positioned at a first distance from the flywheel when the engine is in a stop position and positioned at a second distance from the flywheel when the engine is in a run position. The second distance may be greater than the first distance. At the first distance the magnetic shoe 82 is driven by the force from the rotating magnet of the flywheel 38. At the second distance the magnetic shoe 82 is not driven by the force from the rotating magnet of the flywheel 38.

The reciprocating fuel pump of FIG. 18 may be operated in tandem with the combination valve 31. The reciprocating fuel pump may be operated at the same time and in response to the bail 11 being held against the handle. When the bail 11 is held in the run position, the magnetic pump assembly 81 is held away from the flywheel 38, as illustrated in FIG. 19B. Thus, actuating the actuation cable 12 via the bail 11 moves the magnetic pump assembly 81 away from the flywheel 38, moves the brake portion 9 away from the flywheel 38, and places the combination valve 31 in an engine running state that allows fuel flow from the fuel tank to the carburetor 14 and closes the flow path leaving the carburetor bowl.

When the bail 11 is released to the stop position, the magnetic pump assembly 81 is moved toward the flywheel 38. The bail interface 16 moves the magnetic pump assembly 81 from the first distance to the second distance or from the second distance to the first distance in response to actuation of the bail 11. As the flywheel 38 is slowing down (i.e., in the process of being stopped by the brake portion 9), the flywheel 38 rotates a number of times before it reaches the stopped position or after the brake portion 9 contacts the flywheel 38. In one example, the number of times that the flywheel 38 rotated before stopping is 10 or 20 rotations.

The flywheel 38 may include multiple rotating magnets. The number of reciprocations of the reciprocation member 84 depends on the number of rotating magnets in the flywheel 38 and the number of rotations of the flywheel 38 after the brake is applied before the flywheel comes to a complete stop. The minimum number of reciprocations is based, at least in part, on a quantity of magnets of the flywheel 38. The minimum number of reciprocations is based, at least in part, on a number of rotations for the flywheel 38 after the brake contacts the flywheel 38.

In addition, the number of magnets and/or the braking force may be selected in order to control the number of reciprocations necessary to drain the carburetor 14. The minimum number of reciprocations may be selected, at least in part, on a volume of the fuel pump. The minimum number of reciprocations may be selected, at least in part, on a volume of the carburetor bowl. The number of reciprocations for the fuel pump 88 sufficient to empty the carburetor bowl may be determined based on the size of the carburetor bowl and the size of the fuel pump 88 (e.g., size of the carburetor bowl/size of the fuel pump). The number of rotating magnets in the flywheel 38 may be selected based on the ratio of the size of the carburetor bowl and the size of the fuel pump.

In addition, the magnetic pump assembly 81 is moved toward the flywheel 38 at the same time and in coordination with changing the combination valve 31. The combination valve 31 is placed in an engine stopped state, when the bail 11 is released, to cause the combination valve 31 to close at least one valve that prevents fuel flow from the fuel tank to the carburetor 14 and open at least one valve that provides the flow path leaving the carburetor bowl at the same time the magnetic pump assembly 81 is moved toward the flywheel 38.

Figure 20:
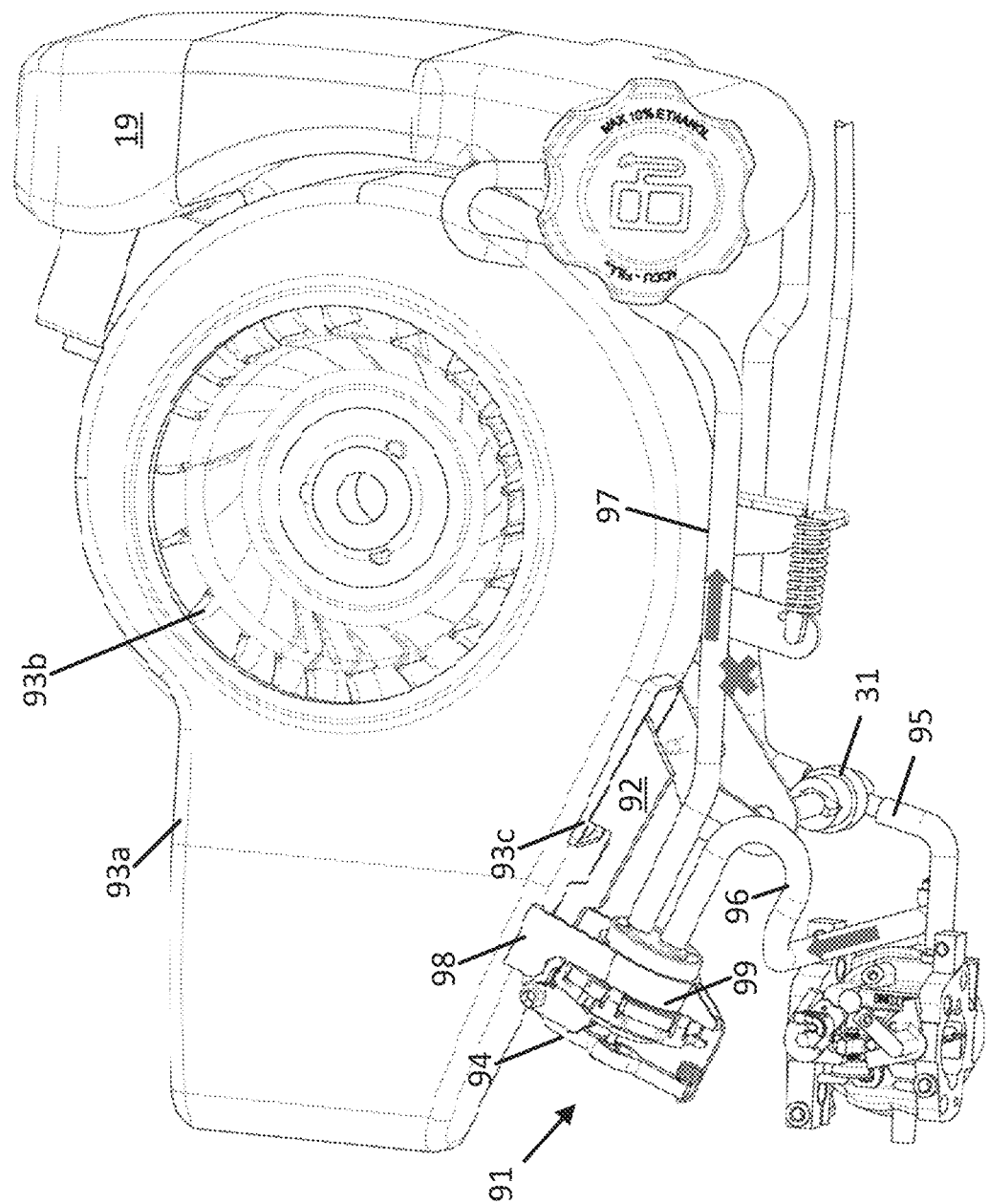
FIG. 20 illustrates an example drain system including an air driven pump.

FIG. 20 illustrates an example drain system including an air driven pump assembly 91. The air driven pump assembly 91 may include an air vane 92, a reciprocating member 94, and a fuel pump 99. The air driven pump assembly 91 may be connected to an input path 96 and an output path 97. The engine may include a housing 93a that surrounds, at least in part, a fan 93b, and includes an air duct 93c. Additional, different, or fewer components may be included.

The air vane 92 is configured to provide a force to the reciprocating member 94 in response to an air flow from the engine. The fan 93b produces the air flow as the fan 93b rotates with the engine. The air vane 92 receives the air flow. The air vane 92 is mounted to mate with the air duct 93c. The air duct 93c may have a cross section shape that is the same shape and similar size to a cross section of the air vane 92 so that the air vane 92 may freely move in and out of the air duct 93c.

The oscillation of the air vane 92 moves the reciprocating member 94. The reciprocating member 94 may be an arm that reciprocates between a first position and a second position. In the first position the air vane 92 is at a first distance (closer distance) to the fan 93b. In the second position the air vane 92 is at a second distance (farther distance) from the fan 93b. Reciprocating between the first position and the second position, the reciprocating member 94 may drive a pump piston of the fuel pump 99 to pump fuel from the carburetor bowl 14.

The fuel pump 99 may be coupled to two or more pipes or hoses including a pump input path 96 and a pump output path 97. The pump input path 96 is connected to the carburetor 14 to carry fuel from the carburetor 14 to the fuel pump 99. The pump output path 97 is connected to the fuel tank 19 to carry fuel from the fuel pump 99 to the fuel tank 19.

In addition, the air driven pump assembly 91 may include a biasing member 98. The biasing member may include a spring or another mechanism for holding the air vane 92 in the first position, closer to the fan 93b, so that the air vane is ready to receive the air flow from the fan 93b. For example, the reciprocating motion may be achieved by the air van 92 through a cycle that includes receiving the air flow, moving to the second position in response to the air flow, and returning to the first position through a force from the biasing member 98. The cycle repeats as the air flow continues.

The reciprocating cycle may repeat a set number of times, or an estimated number of times, as the engine transitions from the running condition to the stopped condition. Various factors may impact the number of times that the air vane 92 and reciprocating member 94 reciprocate as the engine is stopping. Some of the factors may depend on the fan 93b. For example, the number of blades of the fan 93b impacts the volume of the air flow and the number of reciprocations of the air vane 92. In addition, the shape of the blades of the fan 93b impacts the volume of the air flow and the number of reciprocations of the air vane 92.

Some of the factors may depend on characteristics of the air vane 92. For example, the mass of the air vane 92 impacts the quantity and/or speed of air flow that is required to cause the air vane 92 to oscillate. In addition, the shape of the air vane 92 impacts the quantity and/or speed of air flow that is required to cause the air vane 92 to oscillate.

Some of the factors may depend on the biasing member 98. For example, the coefficient of elasticity for the biasing member 98 impacts the force needed to push the air vane 92 back against the biasing force from the biasing member 98. In addition, the angle of the biasing member impacts the force needed to push the air vane 92 back against the biasing force from the biasing member 98.

Any of these factors for the air vane 92, the fan 93b, or the biasing member 98 may be selected in order to control the number of reciprocations necessary to drain the carburetor 14. The minimum number of reciprocations may be selected, at least in part, on a volume of the fuel pump. The minimum number of reciprocations may be selected, at least in part, on a volume of the carburetor bowl. The number of reciprocations for the fuel pump 88 sufficient to empty the carburetor bowl may be determined based on the size of the carburetor bowl and the size of the fuel pump 88 (e.g., size of the carburetor bowl/size of the fuel pump).

Figure 21A:
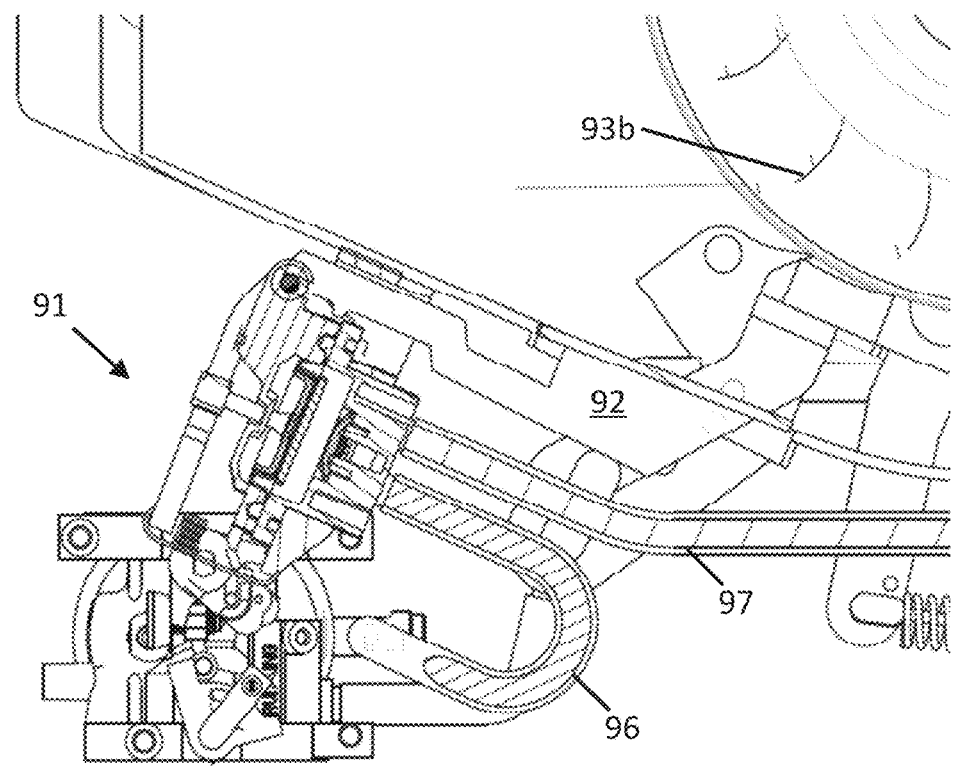
FIG. 21A illustrates the air driven pump of FIG. 20 when the engine is running and the vane is at a minimum oscillation distance.
Figure 21B:
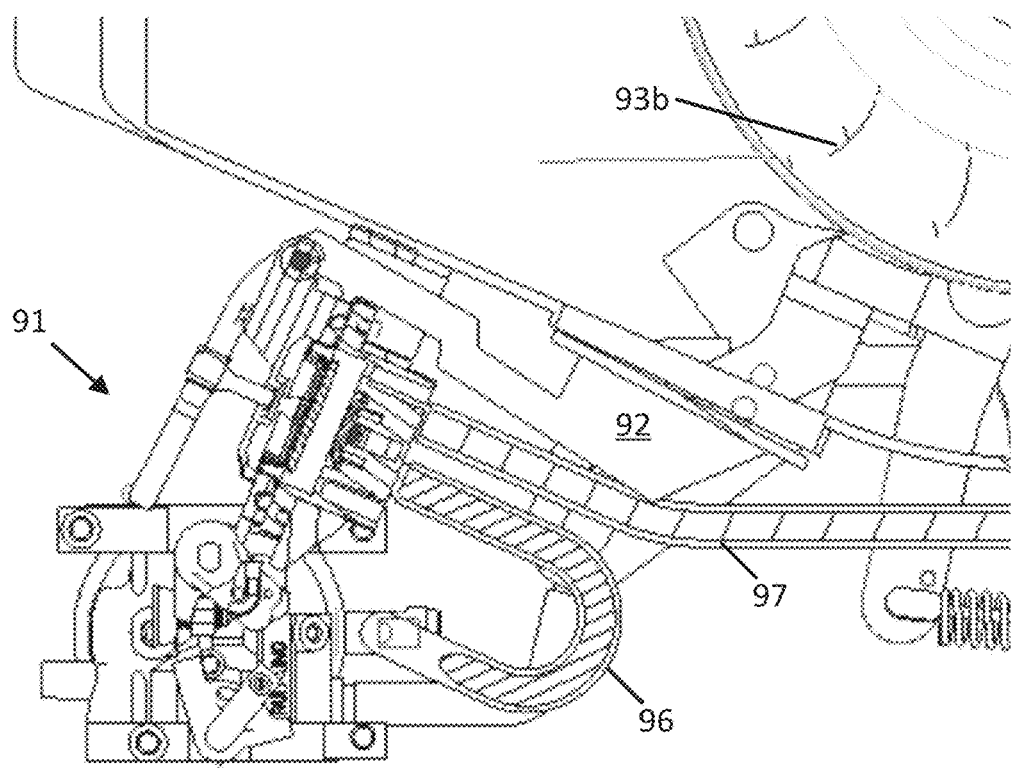
FIG. 21B illustrates the air driven pump of FIG. 20 when the engine is running and the vane is at a maximum oscillation distance.

FIGS. 21A and 21B illustrates the air driven pump of FIG. 20 when the engine is running. The air vane 92 and biasing member 98 may be configured so that when the engine runs in its normal operating speed range (e.g., about 1000 to 4000 rpm) the force of the cooling air on the air vane 92 holds the air vane in the run position. The bail and brake system operate only to turn off (e.g., ground) the ignition, apply the brake and close off the fuel flow from the fuel tank to the carburetor bowl.

The air vane 92 of the air driven pump assembly 91 may be operated at the same time and in response to the bail 11 being held against the handle. When the bail 11 is held in the run position, the air vane 92 is held in the run position.

FIGS. 21A and 21B illustrate the range of motion that the air vane 92 may travel. The air vane 92 fits in a duct in the blower housing. The air flow from the cooling fan creates a force to move the air vane 92 away from the fan 93b. The air vane 92 protrudes outside the air duct as the vane reaches maximum travel (FIG. 21B). At this point, the air pressure on the air vane 92 drops. The spring force may then overcome the air flow force to reset the air vane 92 back to minimum travel (FIG. 21A). This may occur until the engine rotation stops. The oscillation of the air vane 92 drives the reciprocating pump. Thus, FIG. 21A illustrates the air vane location when the engine is not running. FIG. 21B illustrates the air vane 92 when the engine is running in the normal operating speed range (1000-4000 rpm).

In addition, the air driven pump assembly 91 may be operated in coordination with changing the combination valve 31. The combination valve 31 is placed in an engine stopped state, when the bail 11 is released, to cause the combination valve 31 to close at least one valve that prevents fuel flow from the fuel tank to the carburetor 14 and open at least one valve that provides the flow path leaving the carburetor bowl.

Figure 22:
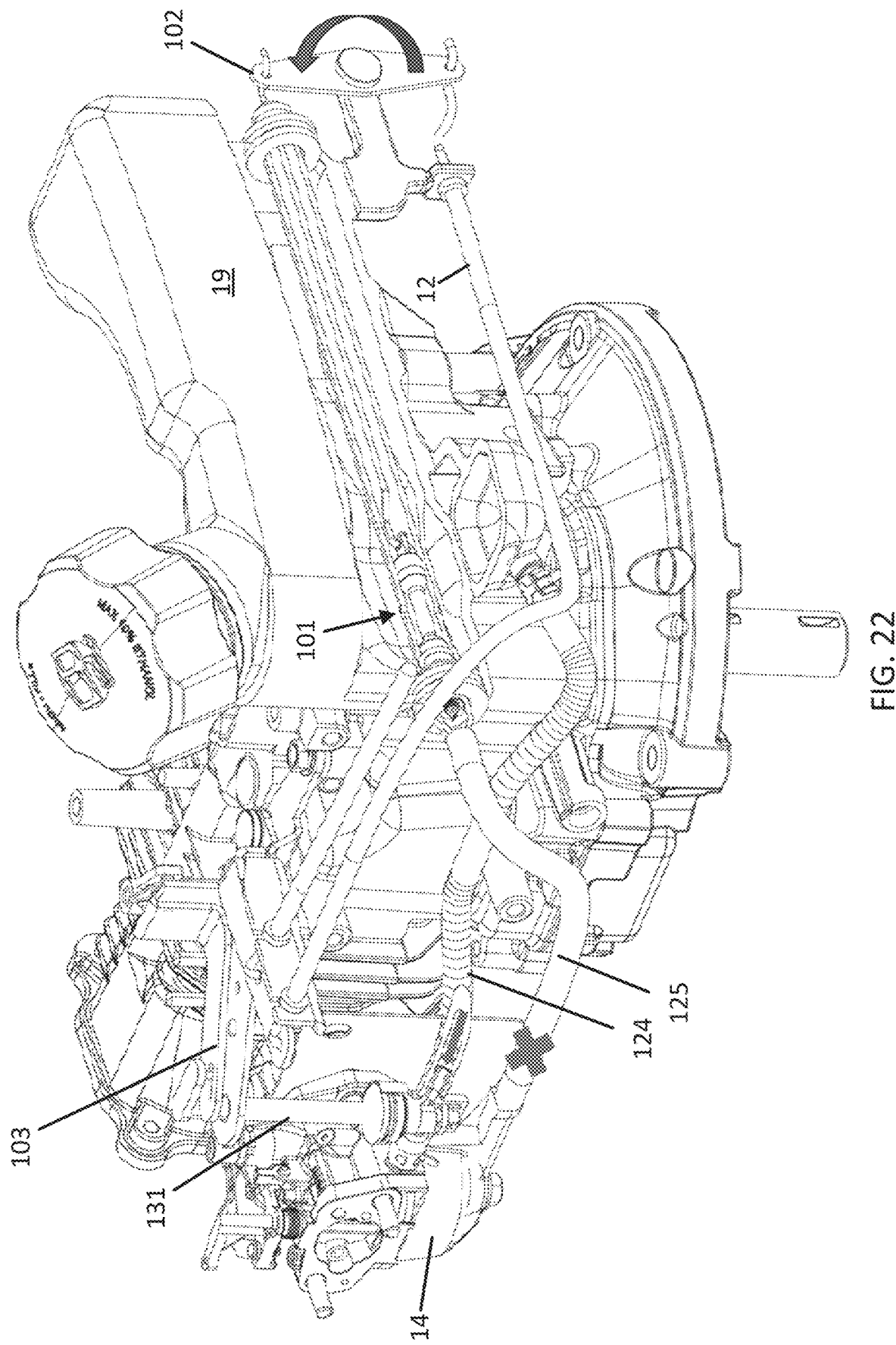
FIG. 22 illustrates an example drain system including a piston pump in a run position for the engine.

FIG. 22 illustrates an example drain system including a piston pump 101, a bell crank 102, a pivoting member 103, and a combination valve 131. The pivoting member 103 connects the brake system and the combination valve 131. The piston pump 101 is connected to a carburetor bowl of carburetor 14 via a fuel evacuation hose 125. The fuel tank 19 is connected to the carburetor 14 via a supply tube 124. The combination valve 131 is configured to open and close valves for the supply tube 124 and the fuel evacuation hose 125. Additional, different, or fewer components may be included.

Figure 23A:
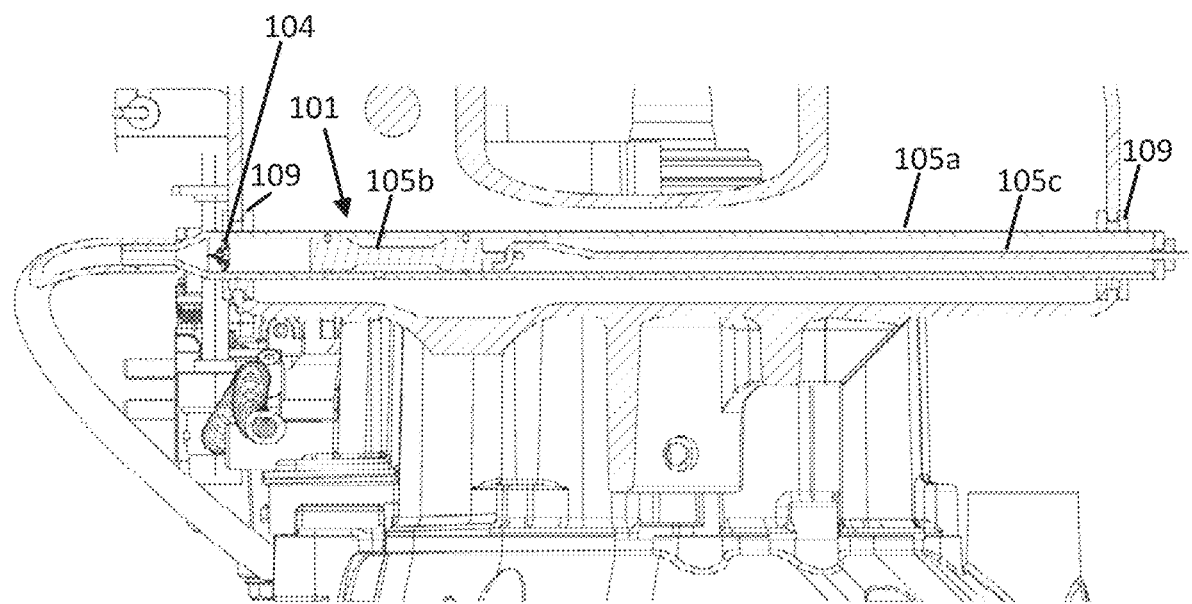
FIGS. 23A and 23B illustrate more detailed views of the piston pump in a run position for the engine.
Figure 23B:
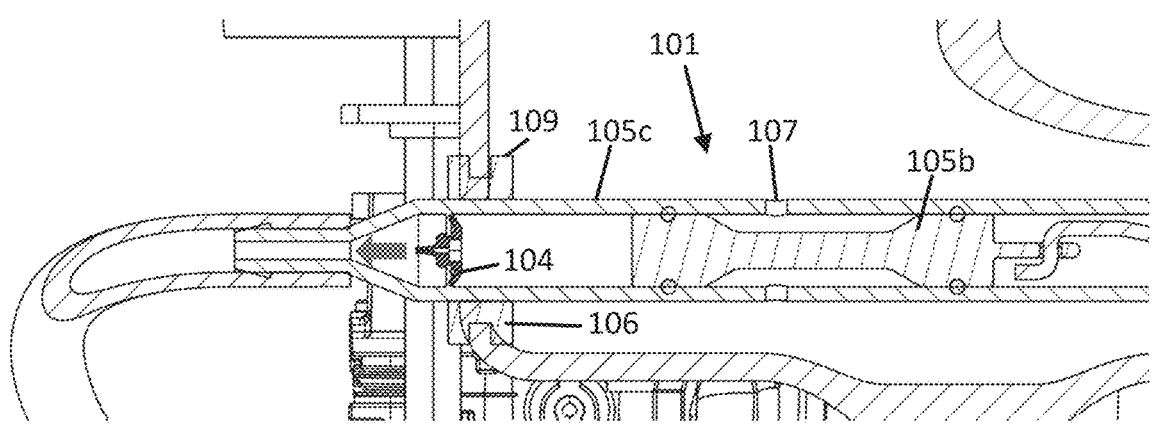
Figure 24:
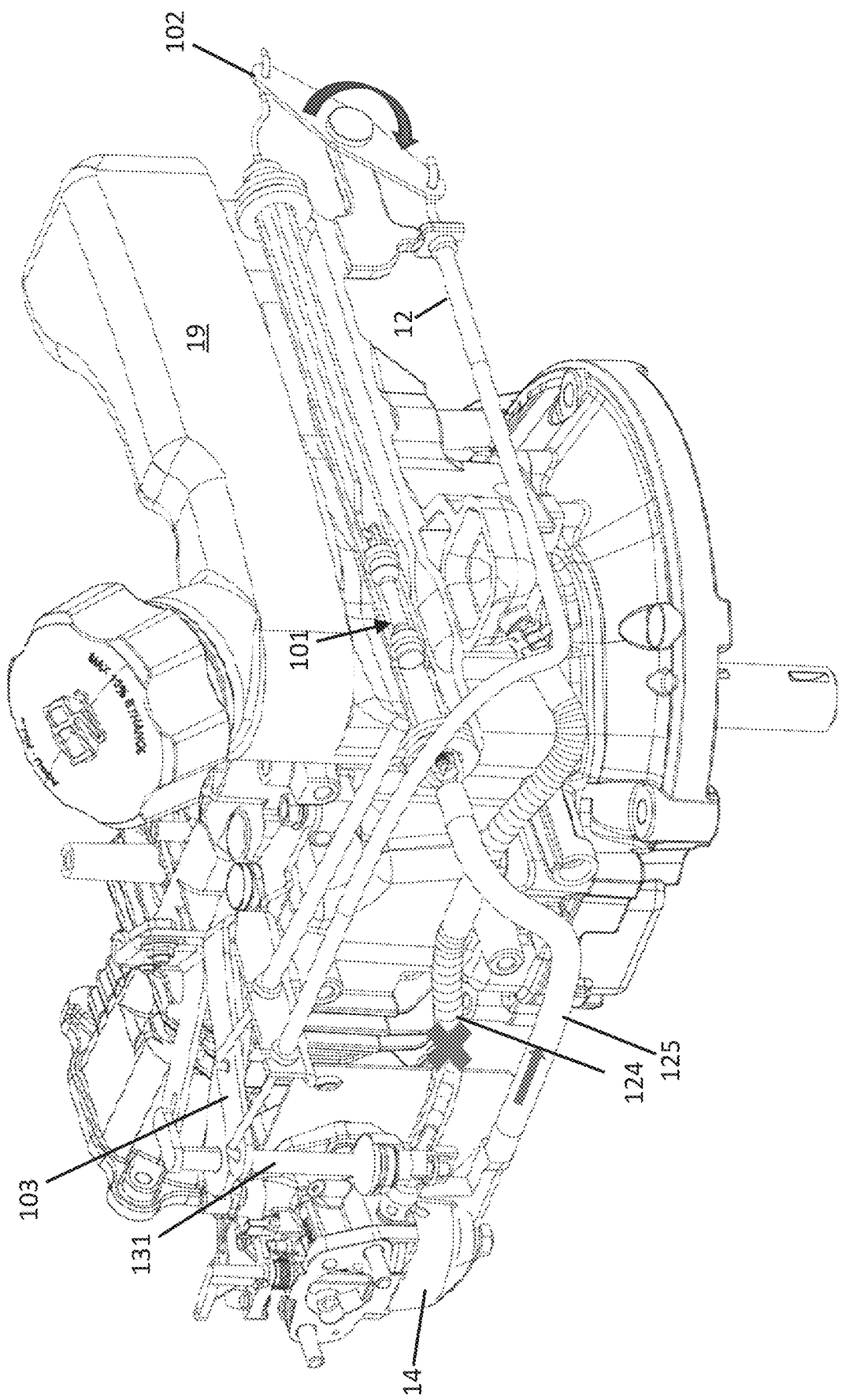
FIG. 24 illustrates an example drain system including a piston pump in a stop position for the engine.
Figure 25A:
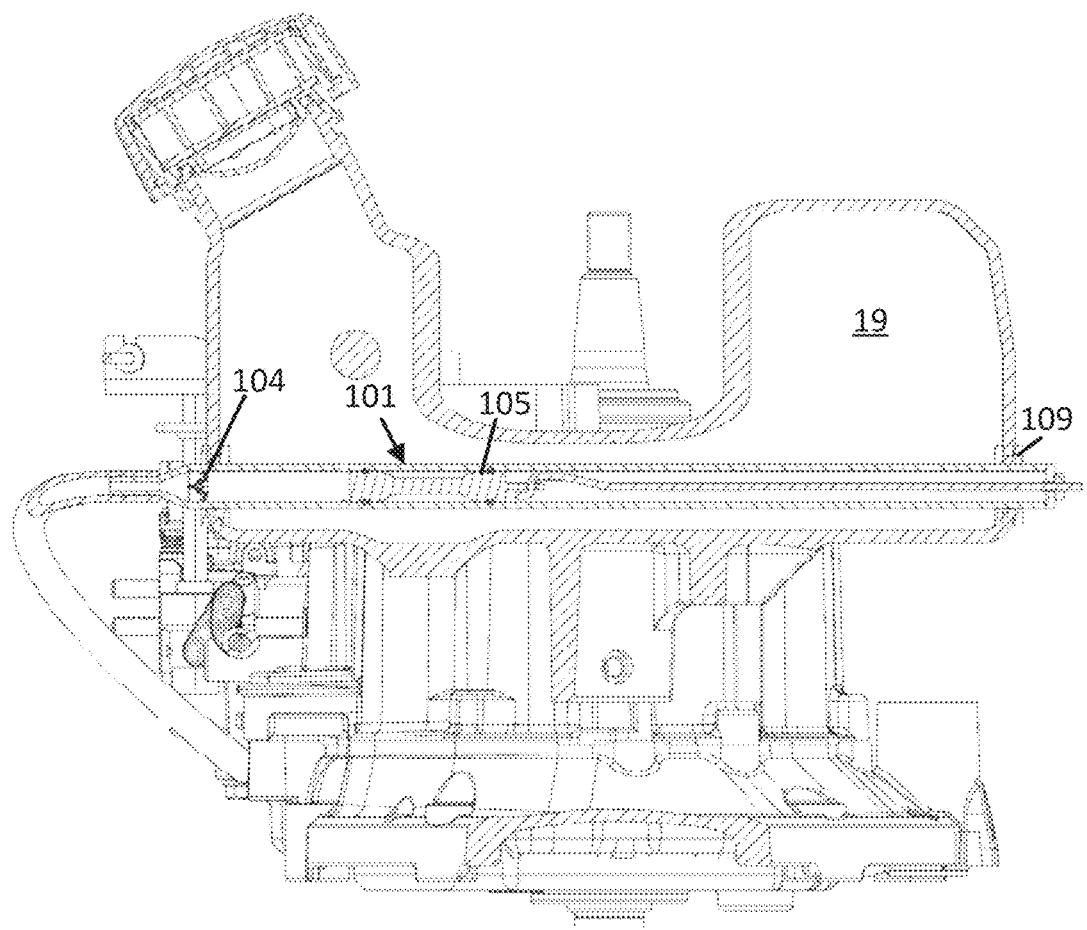
FIGS. 25A and 25B illustrate more detailed views of the piston pump in a stop position for the engine.
Figure 25B:
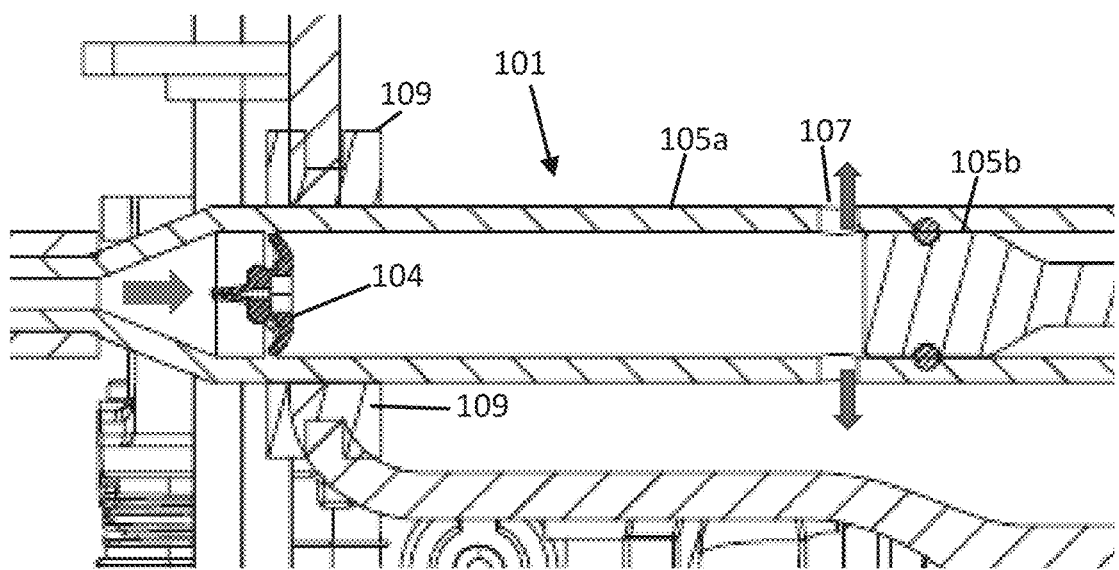

FIG. 22 illustrates the piston pump 101 in a run position. FIGS. 23A and 23B illustrate more detailed views of the piston pump in a mid-stroke position between a stop position and the run position. FIG. 24 illustrates the piston pump 101 in the stop position. FIGS. 25A and 25B illustrate more detailed views of the piston pump in the stop position.

The piston pump 101 is coupled to the bail interface, as described previously, and operable in response to actuation of the bail through a force received via the actuation cable 12. For example, the actuation cable 12 may rotate the bell crank 102 in response to actuation from the bail, and the bell crank applies the rotation to the lateral movement of the piston pump 101. The bell crank 102 may rotate counter clockwise when the bail is held to the handle for the run position. The bell crank 102 may rotate clockwise when the bell is released from the handle for the stop position.

The piston pump 101 may be inside the fuel tank 19. That is, the piston pump 101 is located in a cavity of the fuel tank 19 that also holds fuel. Fuel that is drawn into the piston pump 101 from the carburetor 14 may be released into the fuel tank 19. At least one port 107 in the piston pump 101 allows fuel to flow between the piston pump 101 and the fuel tank 19.

The piston pump 101 may be supported by the fuel tank 19. The piston pump 101 may be mounted to a housing of the fuel tank 19. The housing may include at least two openings for operating the piston pump 101. One of the openings allows for the actuation cable 12 to drive the piston pump 101. One of the opening allows for the piston pump 101 to receive fuel drawn from the carburetor 14.

The piston pump 101 may be supported by one or more gaskets 109. The gaskets 109 may be placed with the at least two openings for operating the piston pump 101. A first gasket for a first opening of the fuel tank 19 may support a first end of the piston pump 101. The first end of the piston pump 101 is associated with the bail interface. A second gasket for a second opening of the fuel tank 19 and a second end of the piston pump 101. The second end of the piston pump 101 is associated with the carburetor.

The piston pump 101 is operable in a first position when the engine is in a run condition, as illustrated in FIG. 22, and the piston pump 101 is operable in a second position when the engine is in a stop condition, as illustrated by FIG. 24.

In one example, the first position for the piston pump 101 may be an idle position. In the idle position, the piston pump 101 may not draw or eject any fuel. In another example, the first position causes the piston pump 101 moves fuel from the fuel tank 19 to the carburetor bowl in order to improve starting. That is, in addition to the fuel supply from the fuel tank 19 to the carburetor 14 through the supply tube 124, the piston pump 101 forces fuel through the fuel evacuation hose 125.

The first position for the piston pump 101 may be to the left side of the fuel tank 19, as illustrated by FIG. 22. The second position for the piston pump 101 for the stop condition of the engine may be away from the left side of the fuel tank 19. The first position of the piston pump 101 may be closer to the carburetor 14 than the second position.

In the second position, the piston pump 101 draws fuel from the carburetor bowl to the fuel tank 19. The fuel may be drawn through the fuel evacuation hose 125 coupled to the second end of the piston pump 101.

The first position and the second position for the piston pump 101 may be associated with settings for the combination valve 131. In the running condition for the engine, the piston pump 101 is in the first position and the combination valve 131 is set to open the supply tube 124 to the carburetor 14 is opened. In some examples, the fuel evacuation hose 125 is closed, and in other examples, the fuel evacuation hose 125 is opened so that fuel may be supplied to the carburetor 14 using the piston pump 101. In the stopping condition for the engine, the piston pump 101 is in the second position and the combination valve 131 is set to close the supply tube 124 to the carburetor and open the fuel evacuation hose 125 to return fuel to the fuel tank 19.

FIG. 25 illustrates a more detailed view of the piston pump 101. The piston pump includes a cylinder 105a, a piston 105b, and a rod 105c. In response to operation of the bail, which may be through the bell crank 102, the rod 105c moves along the longitudinal direction of the cylinder 105a to move the piston 105b to two or more positions along the cylinder 105a. The piston 105b may operate as a syringe that creates a seal for vacuum pressure in the cylinder 105a downstream of the piston 105b. As the piston 105b moves fuel is drawn into the cylinder 105a because of the seal for vacuum pressure. The fuel may be drawn through a check valve 104. The check valve 104 may include an umbrella valve, a duckbill valve, or a combination umbrella/duckbill valve. The check valve 104 may prevent reverse flow from the piston pump 101 to the carburetor 14. The check valve 104 may be replaced with a two-way valve that allows flow in both directions so that the piston pump 101 may also supply fuel to the carburetor 14.

Figure 26:
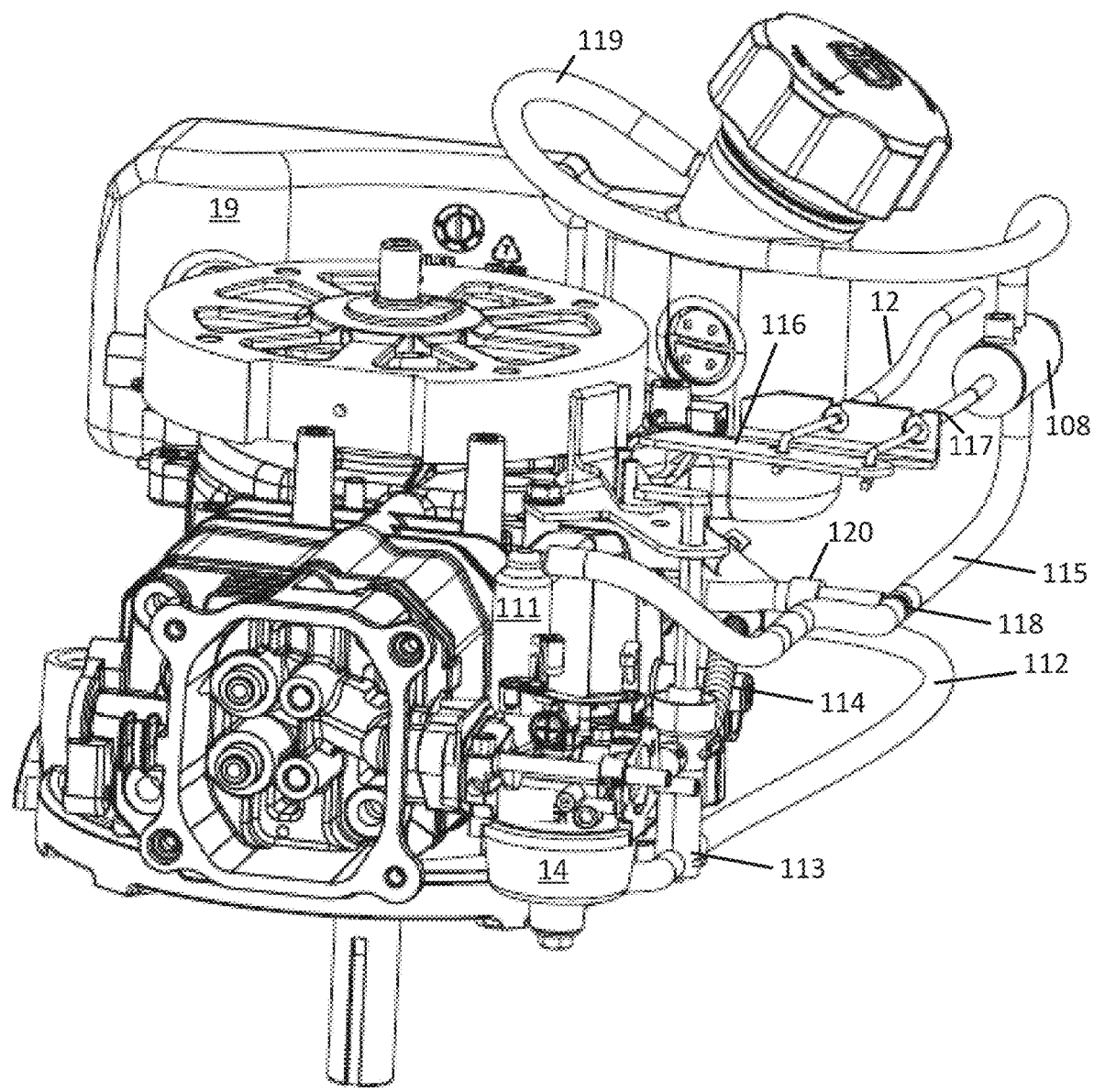
FIG. 26 illustrates an example drain system including a vacuum reservoir.
Figure 27:
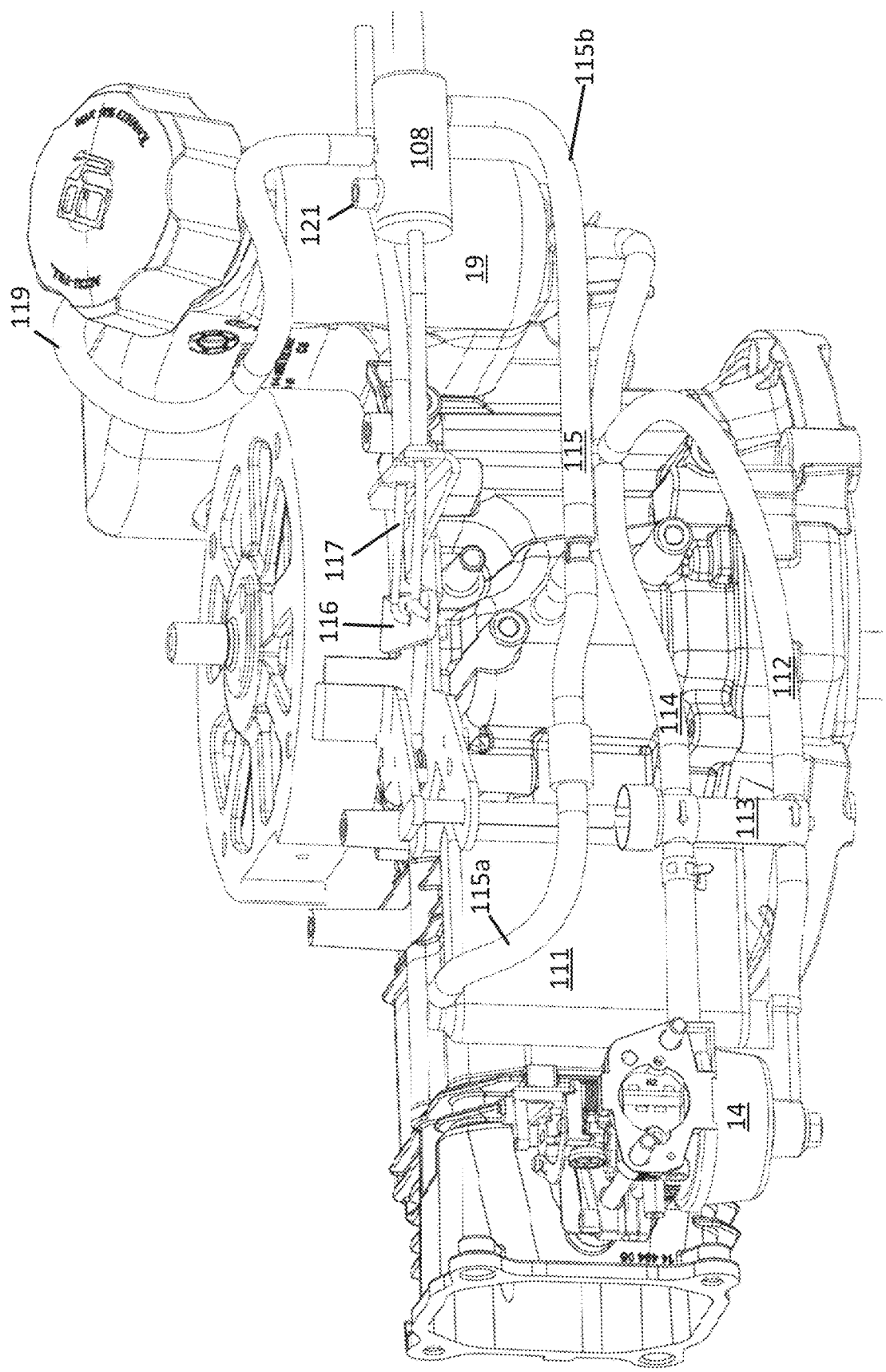
FIG. 27 illustrates a side view of the drain system of FIG. 26.

FIG. 26 illustrates an example drain system including a vacuum reservoir 111 coupled to a vacuum control valve 108. FIG. 27 illustrates a side view of the drain system of FIG. 26.

The vacuum reservoir 111 is a sealed container that is configured to maintain a pressure inside the container that is different than outside the container. The vacuum reservoir 111 may be connected to a crank case vacuum port of the engine. The engine may generate a vacuum pressure through air that builds up in the crank case. 120 The air buildup may be contributed to combustion gases that leak or otherwise pass the combustion chamber.

The engine 10 may include a breather system includes one or more check valves that allows the pressure in the crankcase generated by the intake and the power stroke motion of the piston (to bottom of stroke) to escape the crankcase. There may also be some pressure generated by combustion leakage past the piston rings.

The vacuum hose 115, which is a pressure supply hose, couples the vacuum reservoir 111 to the vacuum control valve 108. The vacuum hose 115 may include a one-way valve (e.g., a check valve) between the vacuum reservoir 111 and the vacuum control valve 108 to prevent a reverse flow back into the vacuum reservoir 111. The vacuum hose 115 may include a reservoir side portion 115a and a valve side portion 115b, which are connected by a tee connector 118. The tee connector 118 connects the vacuum hose 115 to the crank case of the engine to receive vacuum pressure from the engine.

A check valve 120 between the tee connector 118 and the crank case is a one-way valve that allows flow out of the vacuum reservoir 111 but not into the vacuum reservoir 111. The check valve then prevents air flow back into the crankcase on the compression and exhaust strokes (piston moving toward the top of the stroke). This generates a vacuum (negative pressure) in the crankcase. Hose 115 places the vacuum reservoir in communication with this vacuum. The flow is in the direction from the vacuum reservoir to the crankcase. The check valve 120 allows flow from the reservoir to the crankcase when valve 108 is in the run position and prevents vacuum from the reservoir to pull air from the crankcase when valve 108 is in the stop position. The reservoir communicates directly with the fuel tank for the system to draw fuel out of the carburetor bowl. The fuel cap is sealed and is vented to allow gravity flow to the carburetor when the engine is running through valve 108.

The vacuum control valve 108 includes at least one valve that controls the flow of air from the vacuum reservoir 111 to the fuel tank 19. The vacuum control valve 108 may be operated in response to the bail interface 16. When the bail 11 is held close for a running condition of the engine, the vacuum control valve 108 is closed so that there is no flow of air, or a very limited supply of air, from the vacuum reservoir 111 to the fuel tank 19. Then the bail 11 is released for a stopping condition of the engine, the vacuum control valve 108 may be opened so that there is a flow of air from the vacuum reservoir 111 to the fuel tank 19.

An air flow hose 119 between the vacuum control valve 108 and the fuel tank 119. The air flow hose 119 may also include a one-way valve (e.g., a check valve) between the fuel tank 19 and the vacuum control valve 108 to prevent a reverse flow. The air flow into the fuel tank 19 decreases a pressure (e.g., fuel tank pressure) in the fuel tank 19. A low pressure in the fuel tank creates a suction through a fuel return hose 112 connected between the carburetor bowl and the fuel tank 19. The fuel return hose 112 may be directly connected to the fuel tank 19 or indirectly connected to the fuel tank 19 via the fuel control valve 113. The fuel tank pressure causes fuel to be drawn through the fuel return hose 112 from the carburetor bowl.

Figure 28A:
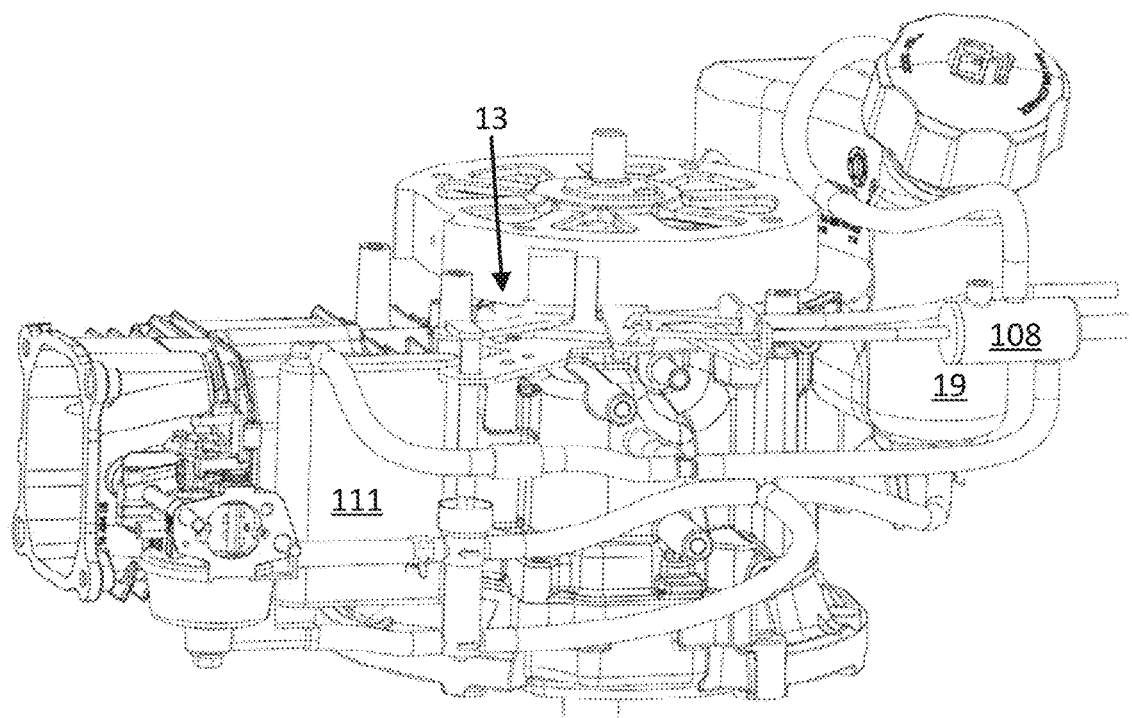
FIGS. 28A and 28B illustrates the drain system of FIG. 26 in a stop position for the engine.
Figure 28B:
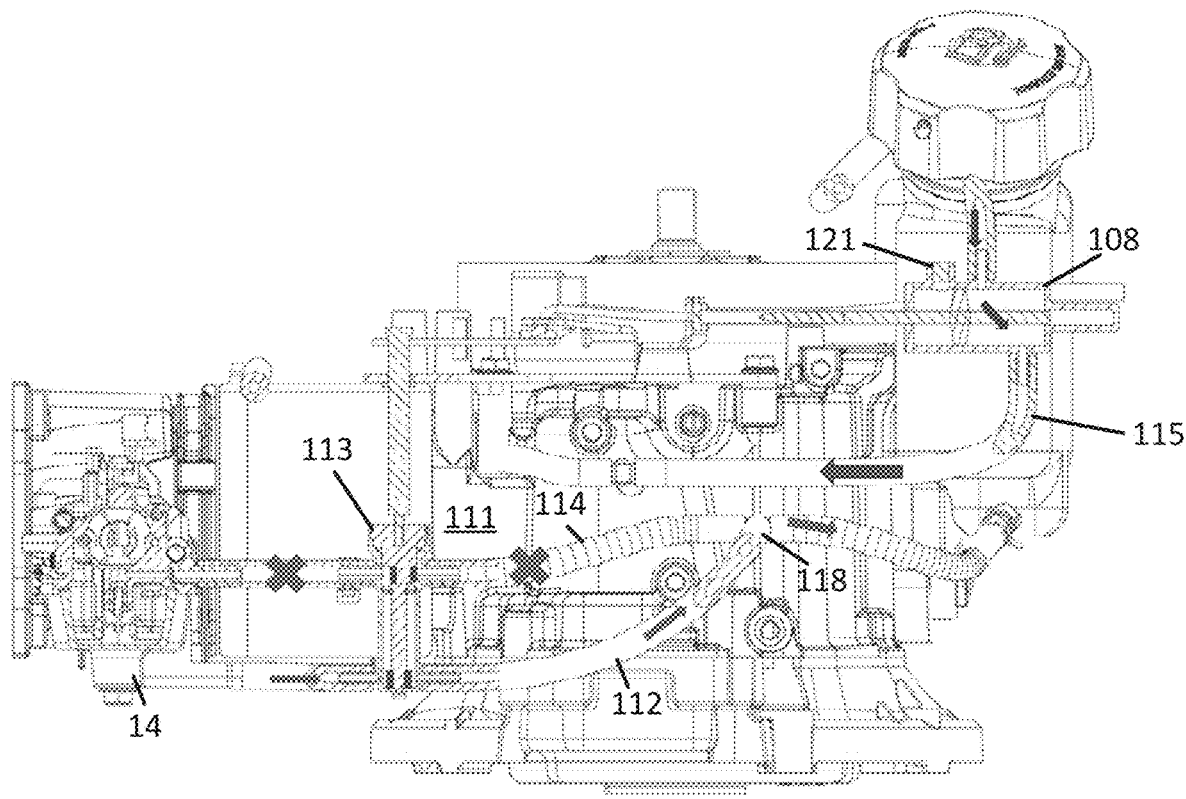
Figure 29A:
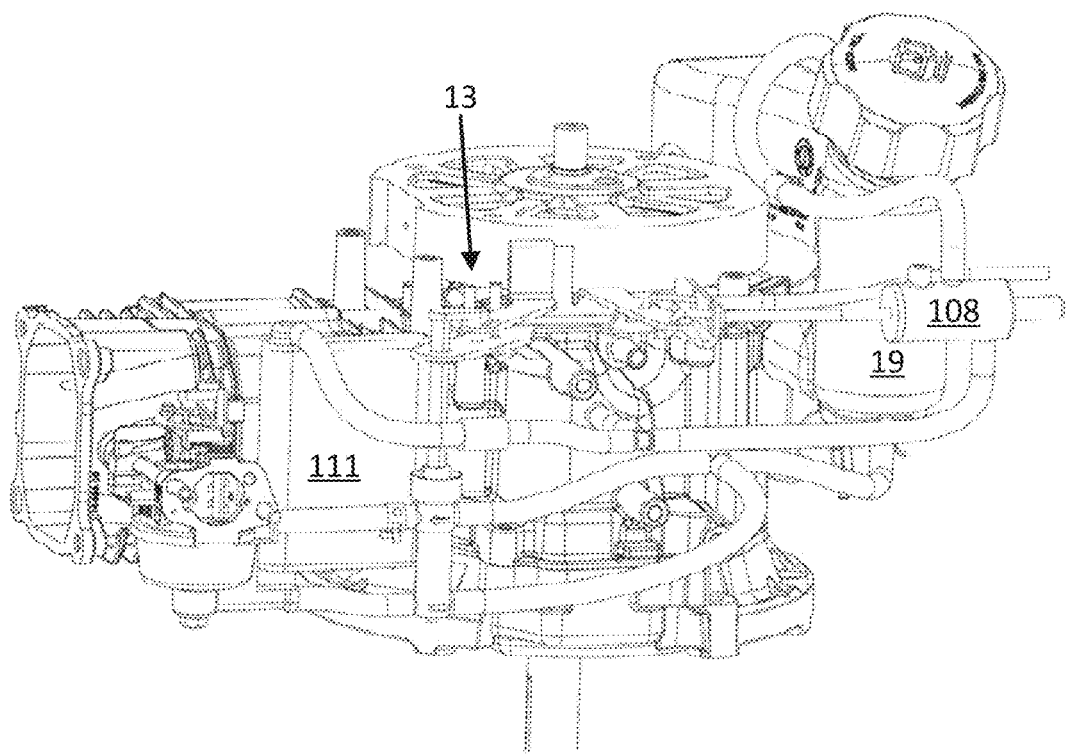
FIGS. 29B and 29B illustrates the drain system of FIG. 26 in a run position for the engine.
Figure 29B:
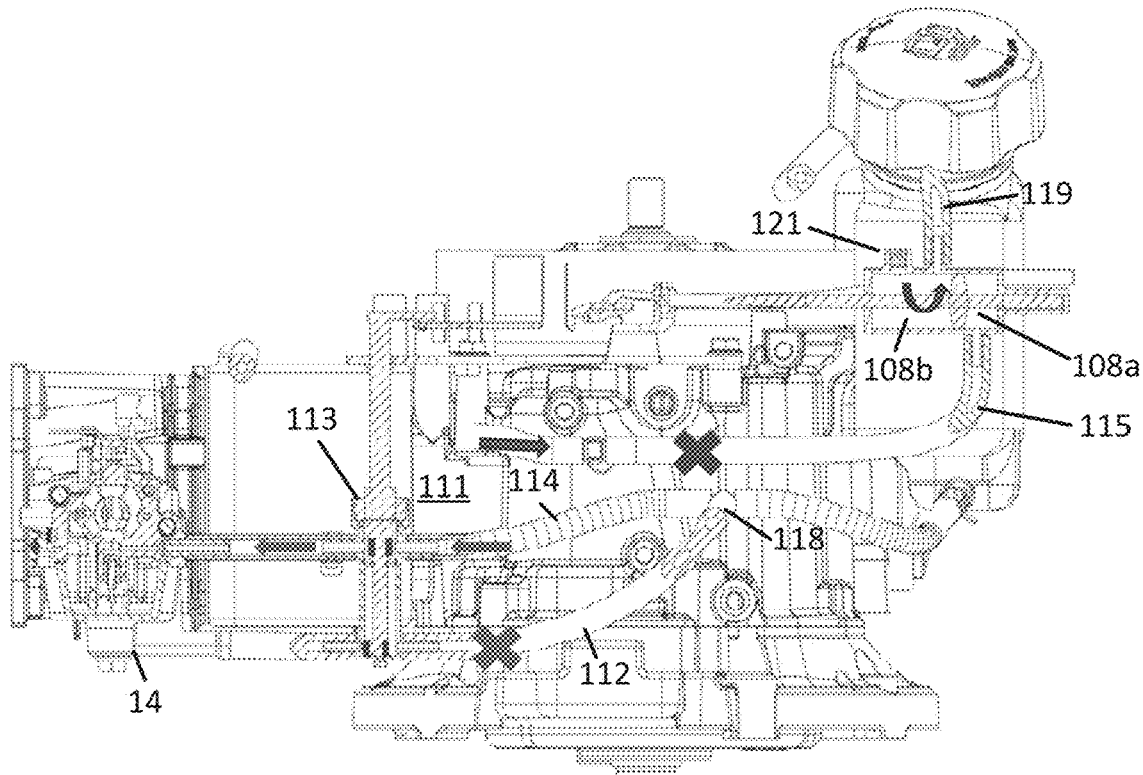

FIGS. 28A and 28B illustrates the drain system of FIG. 26 in a stop condition for the engine. FIGS. 29B and 29B illustrates the drain system of FIG. 26 in a run position for the engine. In the stop condition, the bail 11 has been released causing the actuation cable 12 to bring the brake system 13 in contact with the flywheel 38. The movement of the actuation cable 12 may rotate a brake lever 116 for moving the brake system 13 in and out of contact with the flywheel 38. The brake lever 116 may be connected to a first arm connected to the bail interface and a second arm connected to the vacuum control valve 108. Thus, through the brake lever 116 movement in the bail interface is transferred to the vacuum control valve 108. The first arm rotates with the bail interface and moves the second arm to open the vacuum control valve 108.

The vacuum control valve 108 may include multiple cavities, as illustrated in FIG. 29B, created by a cylinder and a moving piston (spool valve). A first cavity 108a is connected to the vacuum hose 115 connected to the vacuum reservoir 111.

A second cavity 108b is connected to the air flow hose 119 to the fuel tank 19. The second cavity 108b is connected to the air vent port 121 with a dust filter. The air vent port 121 is used to vent the fuel tank when the engine is running. The engine running spool valve connects vent port 121 to the air flow hose 119. Engine stopped spool valve connects vacuum port 115 to the air flow hose 119.

When the brake lever 116 rotates the second arm in a first direction, a valve member opens to connect the first cavity and the second cavity. When the brake lever 116 rotates the second arm in a second direction, the valve closes to connect the first cavity and the second cavity. The valve member may open when the engine is in the stop condition, as shown in FIGS. 28A and 28B. The valve member may close when the engine is in the run condition, as shown in FIGS. 29B and 29B. FIG. 29B illustrates that the fuel cap is sealed but vented to allow gravity flow to the carburetor when the engine is running through valve 108.

In one example, the vacuum control valve 108 may include a third cavity is connected to the atmosphere in the vicinity of the engine through a vent or port 121. The vacuum control valve 108 may include a second valve member to selectively connect the third cavity to the second cavity. When connected, pressure may release from the fuel tank 19 through the second cavity and third cavity to the atmosphere through the port 121. The port 121 may include a filter and/or an absorptive material for removing hydrocarbons or other particulates from the air escaping the fuel tank 19.

The vacuum control valve 108 may be operated in tandem with the fuel control valve 113 (in addition to the brake lever 116). The vacuum control valve 108 may be opened at the same time and in response to the bail 11 being held against the handle. When the bail 11 is held in the run position, the vacuum control valve 108 is set to open for the flow of air, such as an air flow out of the fuel tank 19 or a decrease in pressure in the fuel tank 19. Thus, actuating the actuation cable 12 via the bail 11 moves the reciprocating pump assembly 71 away from the flywheel 38, moves the brake portion 9 away from the flywheel 38, places the combination valve 31 in an engine running state that allows fuel flow from the fuel tank to the carburetor 14 and closes the flow path leaving the carburetor bowl. When the bail 11 is released to the stop position, the vacuum control valve 108 is closed to stop the flow of air out of the fuel tank and/or prevent the pressure in the fuel tank 19 from changing. The fuel control valve 113 is placed in an engine stopped state, when the bail 11 is released, to cause the fuel control valve 113 to close at least one valve that prevents fuel flow from the fuel tank 19 to the carburetor 14 and open at least one valve that provides the flow path leaving the carburetor bowl.

Figure 30:
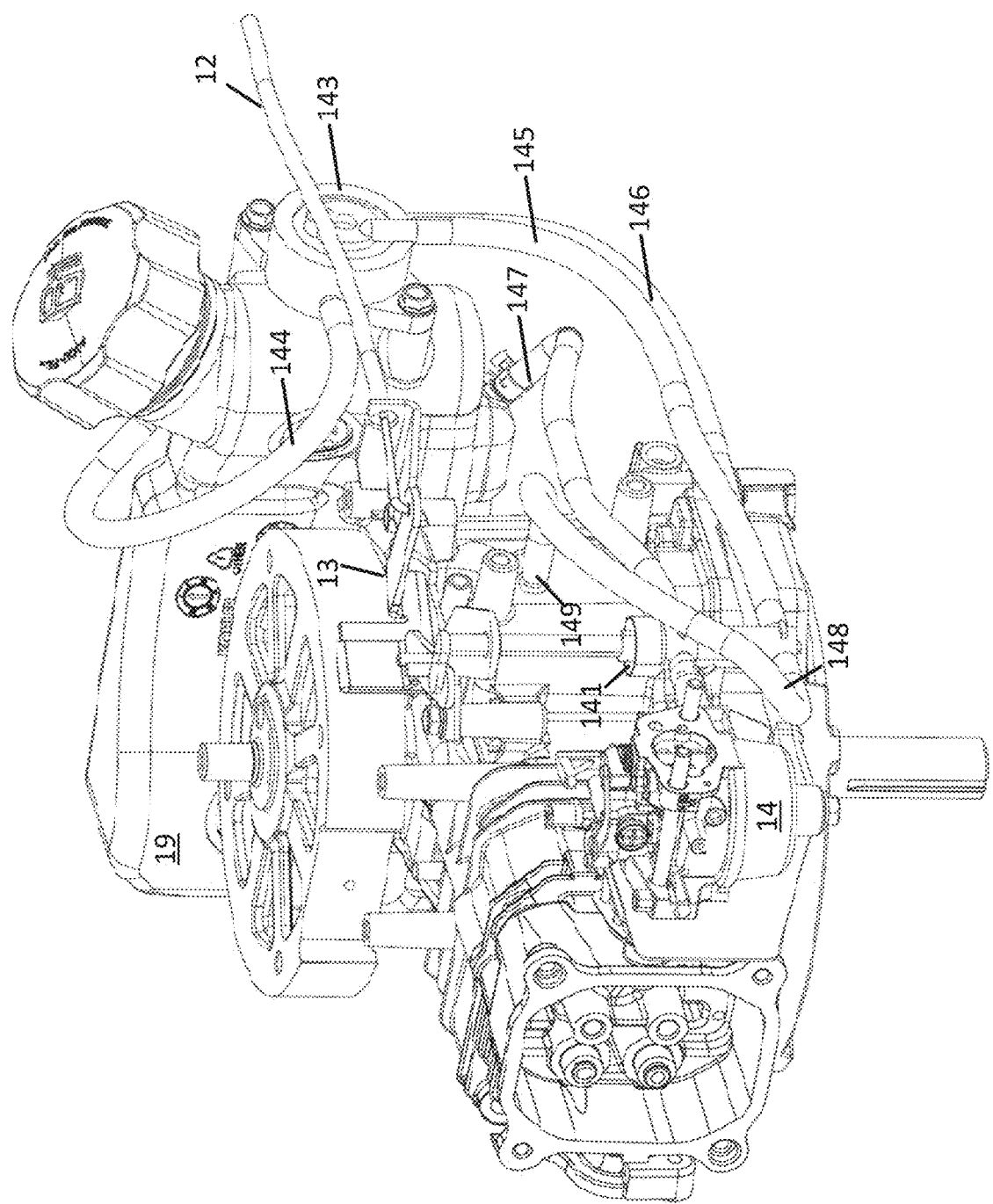
FIG. 30 illustrates an example drain system including a crank case vacuum tube.

FIG. 30 illustrates an example drain system including a crank case vacuum control signal that operates a fuel pump 143. The crank case vacuum control signal may be implemented by a vacuum pulse that turns the fuel pump 143 on and off. The crank case vacuum control signal may be implemented electrically through a circuit that is trigged by the vacuum pulse signal. The fuel pump 143 may be triggered by grounding the circuit in response to the crank case vacuum control signal. In one example, the fuel pump 143 is an electrical pump that is normally off, and the fuel pump 143 is grounded by the crank case vacuum control signal to cause the fuel pump 143 to run.

The fuel pump 143 may be connected to multiple hoses or tubes that connect the fuel pump 143 to other components. A vacuum pulse hose 145 is coupled to a crank case of the engine via crank case 148 to control a vacuum pressure to the fuel tank 19. The engine generates one or more vacuum pulses in response to the stop condition and the vacuum pulses are associated with draining the fuel tank 19. The vacuum pressure draws fuel from the carburetor bowl to the fuel tank 19. The fuel pump 143 pumps fuel from the carburetor bowl to the fuel tank.

In addition, the fuel pump 143 includes a fuel pump outlet path and a fuel pump inlet path. The fuel pump outlet path is from the fuel pump 143 to the fuel tank 19. The fuel pump inlet path is from the carburetor bowl to the fuel pump 143.

Figure 31A:
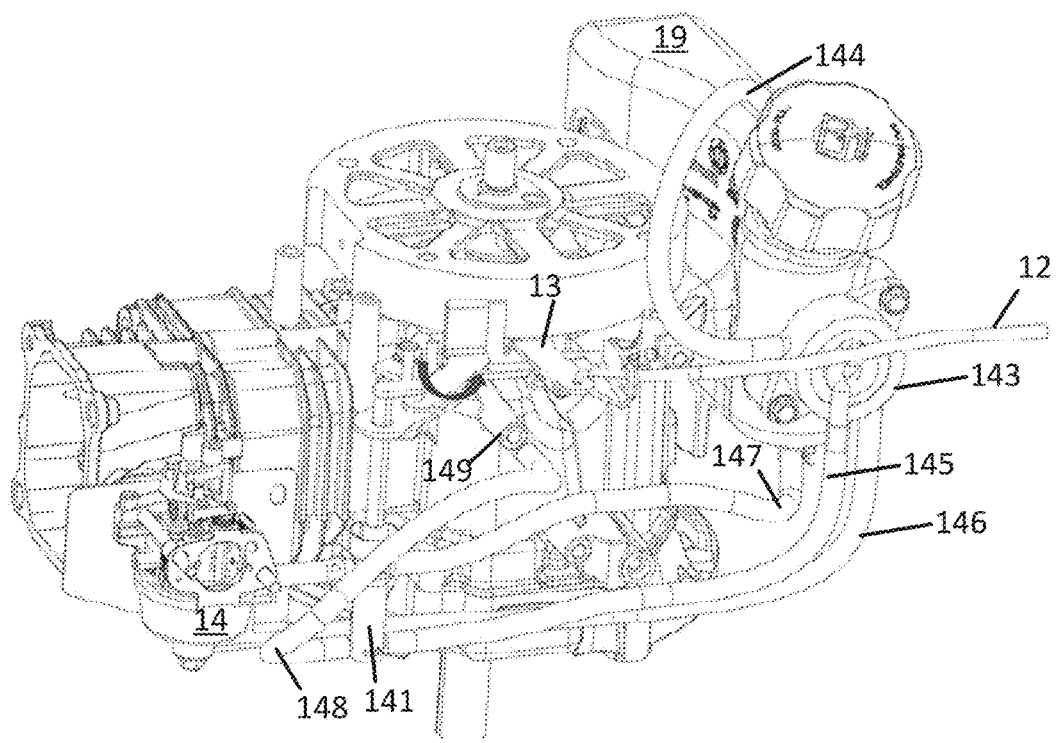
FIGS. 31A and 31B illustrates the drain system of FIG. 30 in a run position for the engine.
Figure 31B:
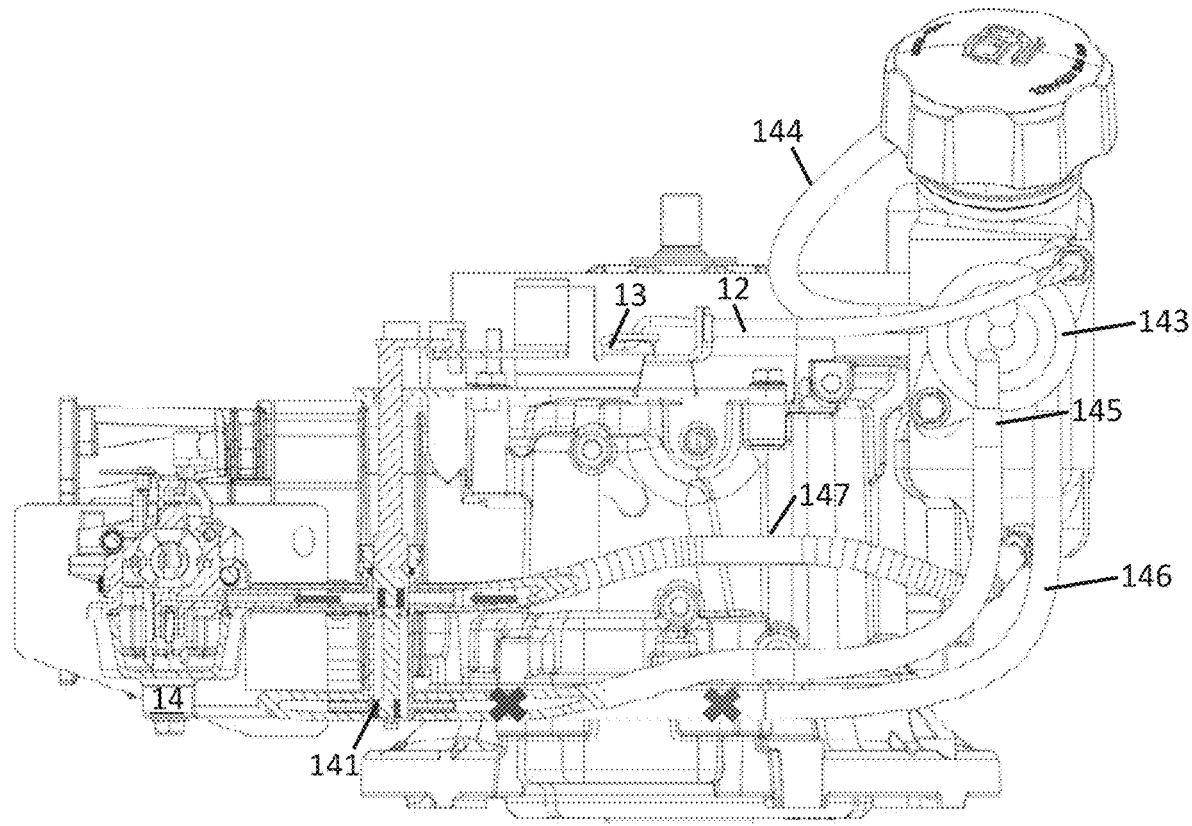
Figure 32A:
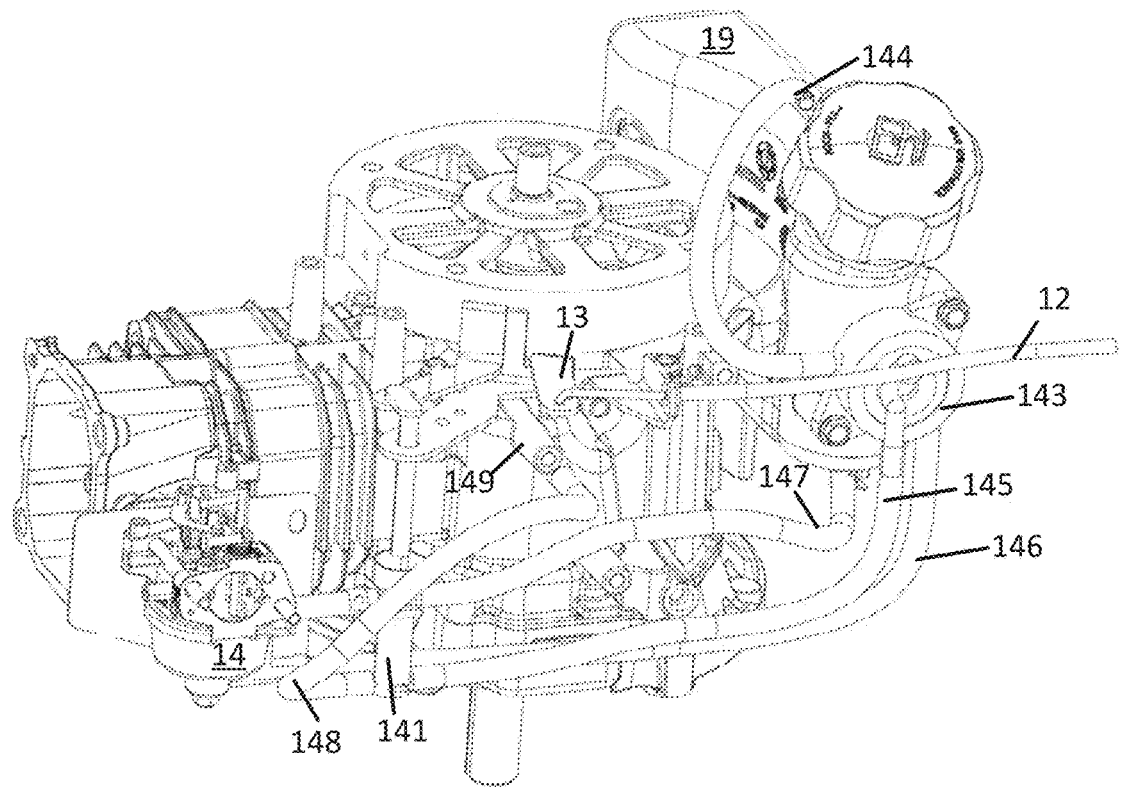
FIGS. 32B and 32B illustrates the drain system of FIG. 30 in a stop position for the engine.
Figure 32B:
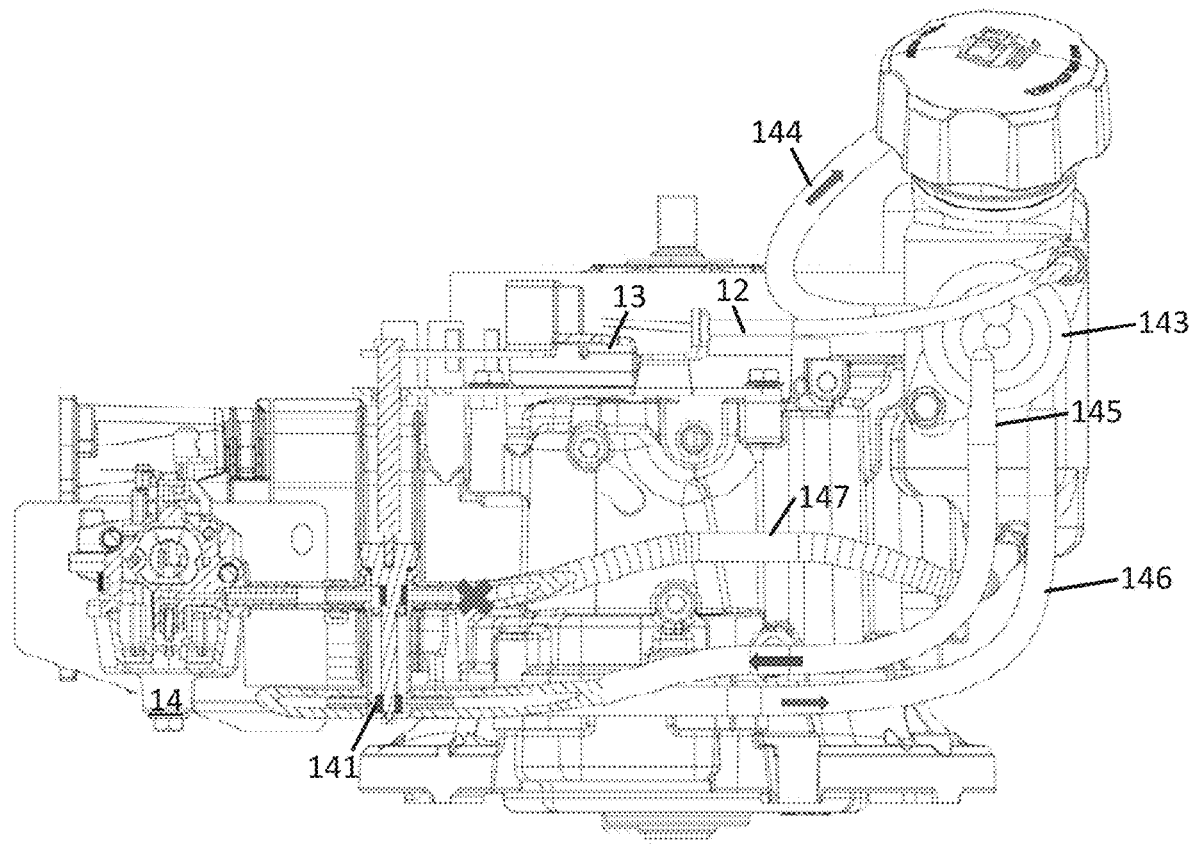

FIGS. 31A and 31B illustrates the drain system of FIG. 30 in a run position for the engine. FIGS. 32B and 32B illustrates the drain system of FIG. 30 in a stop position for the engine.

The combination valve 141 operates multiple valves such as a fuel supply valve and a vacuum pressure valve. A fuel supply valve may open the fuel supply pipe in conjunction with the bail interface 16 and the actuation of the bail 11 when the engine 10 is placed in the running condition and close the fuel supply pipe when the bail 11 and the engine 10 is placed is the stopping condition. The vacuum pressure valve opens the path between the vacuum pulse hose 145 and the engine 10 via crank case 148 to the crank case so that the vacuum pulses reach the fuel pump 143. The vacuum pressure valve also is opened in conjunction with the bail interface 16 and the actuation of the bail 11 when the engine is placed in the stop condition. Likewise, when the bail 11 is held down to keep the engine in the running condition, the vacuum pressure valve of the combination valve 141 may be closed.

Figure 33:
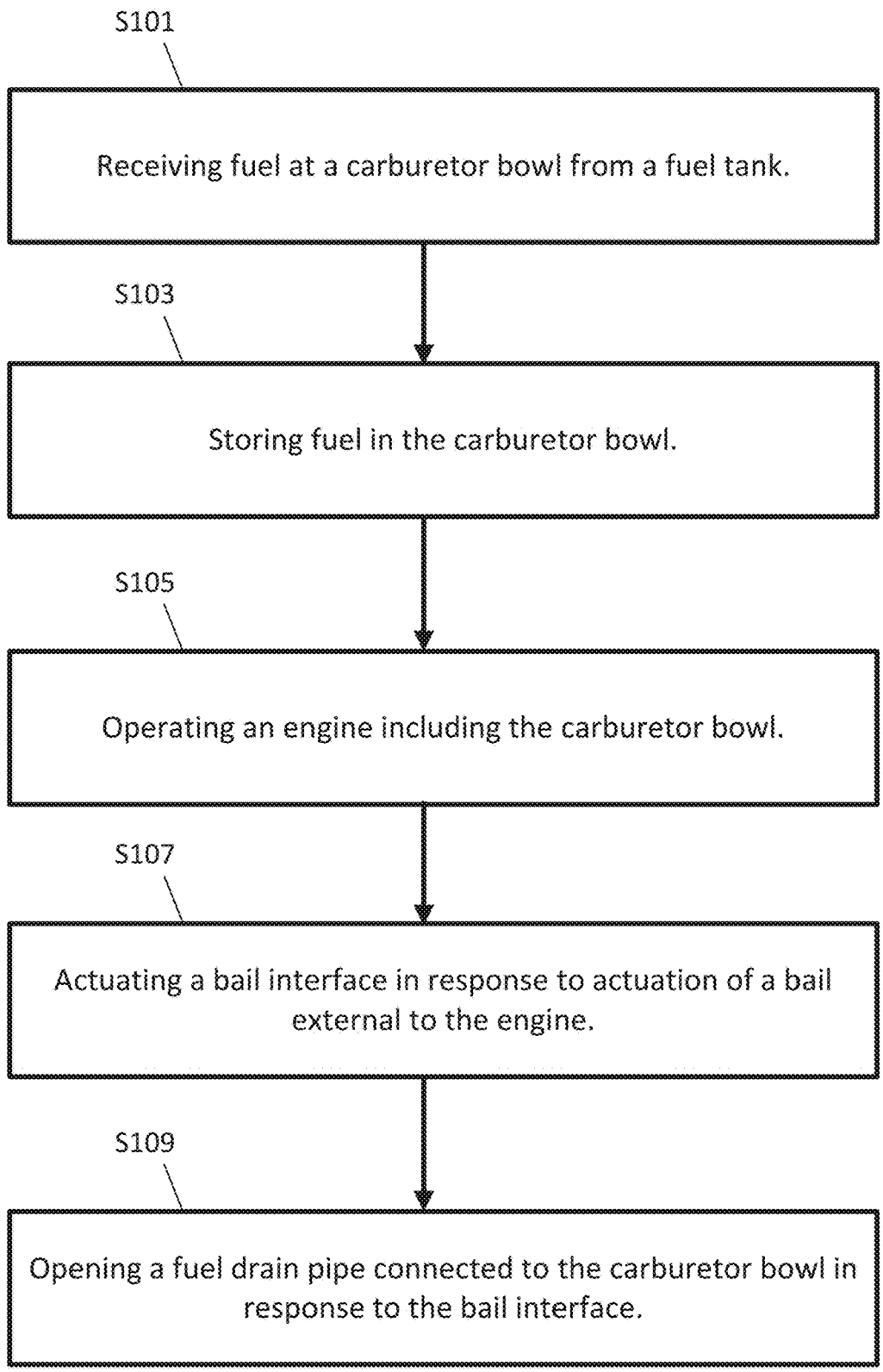
FIG. 33 illustrates an example flowchart for operation of a carburetor draining system.

FIG. 33 illustrates an example flowchart for operation of the carburetor drain according to any of the embodiments described herein. Additional, different, or fewer acts may be included.

At act S101, fuel is received at a carburetor, or more specifically at a carburetor bowl, from a fuel tank via a fuel supply pipe. The fuel may be received in response to a fuel valve setting that opens the fuel supply pipe.

At act S103, fuel is stored in a carburetor bowl. At act S105, an engine including the carburetor is operated. Some of the store fuel (a first portion) is provided to an air passage for mixing with air and providing combustion fuel for the engine and is reduced as the engine runs. There is always fuel available in the carburetor bowl. Thus, some of the fuel (a second portion) remains in the carburetor bowl when the engine is stopped or in a stopping condition.

At act S107, a bail interface is actuated in response to actuation of a bail external to the engine. The bail interface may include one or more mechanical links connected to the bail.

At act S109, a fuel drain pipe connected to the carburetor bowl is opened in response to the operation of the bail interface. The fuel drain pipe may be opened by a combination fuel valve including a fuel drain valve. In addition, the combination valve may include a fuel tank valve for the fuel supply from act S101. In addition, the combination valve may include an air valve for opening or closing an air path that changes a pressure or vacuum associated with the fuel drain pipe. The fuel drain pipe may lead to a fuel tank such that the drain fuel is mixed with fresh fuel in the fuel tank. The fuel drain pipe may lead to a reservoir or an aspirator.

Alternatively, the bail interface may operate one or more other mechanism in response to actuation of the bail. For example, a wheel may be placed in contact with a flywheel of the engine to drive a fuel pump that pumps the stale fuel from the carburetor bowl. A reciprocating pump may be actuated by the bail assembly. A brake may be brought in and out of contact with the flywheel by the bail assembly.

In one alternative, the bail interface may cause a carburetor pivot to rotate at least the carburetor bowl in response to a position of the carburetor draining apparatus. A waste container is coupled to the gravity drain, and the waste container receives fuel from the carburetor bowl in response to opening the gravity drain. The waste container is coupled to an engine. For example, the waste container may be coupled to an oil sump of the engine configured to burn the fuel from the waste container on a subsequent cycle of the engine.

The small internal combustion engine may be applicable to chainsaws, lawn mowers, wood chippers, stump grinders, concrete trowels, mini excavators, concrete saws, portable saw mills, weed trimmers, all-terrain vehicles, wood splitters, pressure washers, garden tillers, tractors, plows, snow blowers, welding equipment, generators, and other devices.

The engine 10 may include one cylinder, two cylinders or another number of cylinders. The one or more cylinders may generate noise or sound waves as a result of the oscillations of one or more pistons through the one or more cylinders, which are shaped to receive the one or more pistons. The one or more pistons may be guided through the one or more cylinders by a connecting rod that is connected to a crankshaft by a crankpin. A combustion chamber includes a combustion chamber adjacent to a head of the piston. The combustion chamber is formed in a cylinder head. In one phase of a combustion cycle for the piston, the exhaust port is blocked from the combustion chamber by the piston, and in a subsequent phase, the exhaust port is in gaseous connection with the combustion chamber to release exhaust gas through the exhaust port to a muffler.

The phrases "connected to," "coupled with" or "coupled to" include directly connected to or indirectly connected through one or more intermediate components. Additional, different, or fewer components may be provided. Additional, different, or fewer components may be included.

The acts of FIG. 33 may be initiated by one or more controllers including a specialized processor, one or more memories and a communication interface. The one or more controllers may operate the check valve by generating open and close commands for the check valve. The open and close commands may be generated in response to data from a sensor (e.g., magnetic sensor or gravity sensor) that describes the orientation of the engine. Instructions for the one or more controllers may be embodied on a non-transitory computer readable medium.

The carburetor drain pump may be controlled according to one or more controllers including a specialized processor, one or more memories and a communication interface. The one or more controllers may enable or disable the carburetor drain pump. The one or more controllers may generate an enable command when the carburetor should be drained. For example, the controller may determine when a predetermined time (e.g., one week or one month) has elapsed. The predetermined time may be selected so that the drain pump is actuated after the engine is stored. Instructions for the one or more controllers may be embodied on a non-transitory computer readable medium.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those skilled in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A carburetor draining apparatus for an engine, the carburetor draining apparatus comprising:
   a carburetor bowl configured to store fuel and provide the fuel to an air passage;
   a fuel supply pipe connected a fuel tank and the carburetor bowl;
   a fuel drain pipe connected to the carburetor bowl;
   a bowl drain valve connected to the fuel drain pipe;

a reservoir connected to the bowl drain valve and isolated from the fuel tank such that no fuel from the reservoir returns to the fuel tank, the reservoir configured to store fuel drained from the carburetor bowl via the fuel drain pipe; and a bail interface configured to operate in response to actuation of a bail to open the bowl drain valve and drain fuel from the carburetor bowl to the reservoir.

2. The carburetor draining apparatus of claim 1, further comprising:

a brake system coupled to the bail interface, wherein the brake system slows the engine in response to actuation of the bail interface.

3. The carburetor draining apparatus of claim 2, wherein the brake system includes a brake portion configured to selectively contact a flywheel of the engine.

4. The carburetor draining apparatus of claim 3, wherein the brake system includes a spring configured to bias the brake portion with respect to the flywheel.

5. The carburetor draining apparatus of claim 4, wherein the actuation of the bail opposes the bias of the brake portion with respect to the flywheel.

6. The carburetor draining apparatus of claim 1, further comprising:

an aspirator configured to provide stored fuel from the reservoir to the carburetor bowl.

7. The carburetor draining apparatus of claim 6, further comprising:

a mixing tube configured to draw the stored fuel from the aspirator and the reservoir and mix the drawn fuel in an intake manifold.

8. The carburetor draining apparatus of claim 1, further comprising:

a combination fuel valve including a fuel tank valve and the bowl drain valve, wherein the fuel tank valve is configured to close the fuel supply pipe in conjunction with the bail interface and the actuation of the bail, and wherein the bowl drain valve is configured to open the fuel drain in conjunction with the bail interface and the actuation of the bail.

9. The carburetor draining apparatus of claim 1, further comprising:

a flow restrictor configured to slow a flow from the carburetor bowl to the fuel tank.

10. The carburetor draining apparatus of claim 1, further comprising:

a fuel pump; and a fuel pump vacuum pulse hose connected the fuel pump and a crankcase of the engine to provide air pressure to operate the fuel pump.

11. The carburetor draining apparatus of claim 1, further comprising:

a vacuum reservoir configured to store a pressure; and a vacuum control valve operable in response to the bail interface.

12. The carburetor draining apparatus of claim 1, further comprising:

a vacuum pulse hose coupled to a crank case of the engine to control a vacuum pressure to the fuel tank.

13. The carburetor draining apparatus of claim 1, wherein a vacuum control signal is generated by the engine and controls a fuel pump.

14. A carburetor draining apparatus comprising:

a bail interface configured to operate in response to actuation of a bail for a stopping condition of an engine;

a fuel drain pipe connected to a carburetor bowl of a carburetor, the fuel drain pipe configured to drain fuel;

a valve connected to the fuel drain pipe; and a reservoir connected to the valve;

wherein the valve is configured to open and allow fuel to drain to the reservoir in response to the actuation of the bail for the stopping condition of the engine; and wherein the fuel in the reservoir is delivered to an air passage of the carburetor via an aspirator.

15. A method for draining a carburetor for an engine, the method comprising:

a carburetor bowl receiving fuel from a fuel tank via a fuel supply pipe;

operating a bail interface in response to actuation of a bail external to the engine;

opening a valve connected to the carburetor bowl in response to the operation of the bail interface; and draining fuel to a reservoir via the valve, the reservoir isolated from the fuel tank such that no fuel from the reservoir returns to the fuel tank.

\* \* \* \* \*